United States Patent
Zhou et al.

(10) Patent No.: US 11,294,191 B2
(45) Date of Patent: *Apr. 5, 2022

(54) OPTICAL ELEMENT ARRANGEMENTS FOR VARYING BEAM PARAMETER PRODUCT IN LASER DELIVERY SYSTEMS

(71) Applicants: Wang-Long Zhou, Andover, MA (US); Parviz Tayebati, Sherborn, MA (US); Bien Chann, Merrimack, NH (US); Francisco Villarreal-Saucedo, Middleton, MA (US)

(72) Inventors: Wang-Long Zhou, Andover, MA (US); Parviz Tayebati, Sherborn, MA (US); Bien Chann, Merrimack, NH (US); Francisco Villarreal-Saucedo, Middleton, MA (US)

(73) Assignee: TERADIODE, INC., Wilmington, MA (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/515,124

(22) Filed: Jul. 18, 2019

(65) Prior Publication Data

US 2020/0012114 A1 Jan. 9, 2020

Related U.S. Application Data

(63) Continuation of application No. 15/188,076, filed on Jun. 21, 2016, now Pat. No. 10,401,633.
(Continued)

(51) Int. Cl.
*G02B 27/09* (2006.01)
*G02B 7/00* (2021.01)
(Continued)

(52) U.S. Cl.
CPC ......... *G02B 27/0927* (2013.01); *G02B 7/005* (2013.01); *G02B 27/1086* (2013.01);
(Continued)

(58) Field of Classification Search
CPC ............... G02B 27/0927; G02B 27/1086; G02B 7/005; G02B 27/30; G02B 27/0961;
(Continued)

(56) References Cited

U.S. PATENT DOCUMENTS 4,844,574 A * 7/1989 Chande .............. B23K 26/0604
385/33
5,684,642 A 11/1997 Zumoto et al.
(Continued)

FOREIGN PATENT DOCUMENTS

| JP | 2004-227670 A | 8/2004 |
|---|---|---|
| JP | 2006-133605 A | 5/2006 |
| JP | 2015-087536 A | 5/2015 |

OTHER PUBLICATIONS

Intenational Search Report and Written Opinion issued in a corresponding International Application No. PCT/US2016/038489 dated Oct. 18, 2016.

*Primary Examiner* — Kimberly N. Kakalec
(74) *Attorney, Agent, or Firm* — Morgan, Lewis & Bockius LLP

(57) ABSTRACT

In various embodiments, laser delivery systems feature one or more optical elements for receiving a radiation beam and altering the spatial power distribution thereof, a lens manipulation system for changing a position of at least one optical element within the path of the radiation beam, and a controller for controlling the lens manipulation system to achieve a target altered spatial power distribution on a workpiece.

26 Claims, 21 Drawing Sheets

Related U.S. Application Data

(60) Provisional application No. 62/183,210, filed on Jun. 23, 2015.

(51) Int. Cl.
*G02B 27/10* (2006.01)
*G02B 27/30* (2006.01)
*G02B 19/00* (2006.01)
*B23K 26/064* (2014.01)

(52) U.S. Cl.
CPC ........ *B23K 26/064* (2015.10); *G02B 19/0057* (2013.01); *G02B 27/0944* (2013.01); *G02B 27/0961* (2013.01); *G02B 27/30* (2013.01)

(58) Field of Classification Search
CPC ............ G02B 27/0944; G02B 19/0057; G02B 27/0933; G03F 7/0252; G03F 7/0255; G03F 7/70025; B41C 1/05; B41C 1/145; B23K 26/064; B23K 1/0056; B23K 9/1274

See application file for complete search history.

(56) References Cited

U.S. PATENT DOCUMENTS

| | | |
|---|---|---|
| 9,250,390 B2 | 2/2016 | Muendel et al. |
| 10,401,633 B2* | 9/2019 | Zhou .................. G02B 27/1086 |
| 2005/0112474 A1 | 5/2005 | Sandstrom |
| 2006/0245084 A1 | 11/2006 | Brustle et al. |
| 2013/0044371 A1 | 2/2013 | Rupp et al. |
| 2013/0200052 A1 | 8/2013 | Wittwer |
| 2014/0036358 A1 | 2/2014 | Chann et al. |
| 2014/0097161 A1 | 4/2014 | Watanabe |
| 2016/0377874 A1 | 12/2016 | Zhou et al. |

* cited by examiner

OPTICAL ELEMENT ARRANGEMENTS FOR VARYING BEAM PARAMETER PRODUCT IN LASER DELIVERY SYSTEMS

RELATED APPLICATIONS

This application is a continuation of U.S. patent application Ser. No. 15/188,076, filed Jun. 21, 2016, which claims the benefit of and priority to U.S. Provisional Patent Application No. 62/183,210, filed Jun. 23, 2015, the entire disclosure of each of which is hereby incorporated herein by reference.

TECHNICAL FIELD

In various embodiments, the present invention relates to laser systems, specifically laser systems with controllable beam parameter products.

BACKGROUND

High-power laser systems are utilized for a host of different applications, such as welding, cutting, drilling, and materials processing. Such laser systems typically include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). (BPP values disclosed herein are in units of mm-mrad unless otherwise indicated.) A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

In many laser-processing applications, the desired beam spot size, divergence, and beam quality may vary depending on, for example, the type of processing and/or the type of material being processed. In order to make such changes to the BPP of the laser system, frequently the output optical system or the optical fiber must be swapped out with other components and/or realigned, a time-consuming and expensive process that may even lead to inadvertent damage of the fragile optical components of the laser system. Thus, there is a need for alternative techniques for varying the BPP of a laser system that do not involve such adjustments to the laser beam or optical system at the output of the optical fiber.

SUMMARY

Embodiments of the present invention use optical elements capable of laser beam shaping to achieve desired spatial beam profiles that modify beam quality (particularly BPP). More specifically, changing the optical geometry of optical elements by moving or displacing their position transverse or longitudinal to the optical axis of the laser beam may be utilized to produce variable BPP. In embodiments of the invention, optical elements are located in the beam path with switchable states, producing different beam deflections or diffractions, depending on their position. The use of optical elements in accordance with embodiments of the present invention enables variation of BPP regardless the shape, quality, wavelength, bandwidth, and number of beams corresponding to the input laser beam(s). The output beam with controllably variable BPP may be utilized to process a workpiece in such applications as welding, cutting, drilling, etc.

One advantage of variable BPP is improved laser application performance for different types of processing techniques or different types of materials being processed. Several techniques have been investigated for modifying laser BPP. Laser beam quality may be improved by mode cleaners which include resonant mode cleaners, non-resonant mode cleaners, and optical fiber. Various techniques for varying BPP of laser beams have been described in U.S. patent application Ser. No. 14/632,283, filed on Feb. 26, 2015, the disclosure of which is incorporated in its entirety herein by reference. In comparison with mode cleaner cavities or the use of optical single-mode fibers, non-resonant mode cleaners are relatively easy to align. This method may be divided into transverse beam shaping by using spatial filter, refractive optics, and adaptive optics, and longitudinal shaping by using time and frequency domain methods. Differing beam intensity distribution that is induced by optical elements (refractive optics) modifies beam quality and, therefore, BPP. By using translation (e.g., motorized translation) of the optical elements that have different effective optical geometries in the beam path, real-time dynamic changes of BPP may be realized.

Laser beam shaping is the process of redistributing the intensity (irradiance) and phase of the beam. The intensity distribution defines the beam profile, such as Gaussian, Bessel, annular, multimode, rectangular, top-hat, elliptical or circular, and different intensity profiles may be critical and necessary for specific laser materials processing techniques. Among several methods have been investigated for beam shaping in the near field, the most straightforward approach is through the use of apodization and truncation. Since this approach is fundamentally energy inefficient, reflective optics, refractive optics, diffractive optics, acousto-optics, and/or liquid crystals are generally employed to shape the laser beam by using field-mapping methods. Another approach for beam shaping is beam integration, which involves mixing fractions of the input beam to smooth out the intensity spikes, i.e., beam homogenization by means of integration based on splitting the input beam into beamlets that overlap at the focal plane of a lens.

In embodiments of this invention, the optical element is located in the delivery system that delivers the laser beam to the workpiece and focuses the laser. The delivery system may be configured and/or packaged as, for example, a cutting head or a welding head. Embodiments of the invention vary the beam quality in order to enable a controllably variable BPP at the work station (and/or at the workpiece disposed thereon). The variable BPP module may include one or more optical elements, a motorized translating stage, a collimating lens, and a focusing lens. Embodiments of the invention may feature any one or more of multiple types of refractive optics for the optical elements are used to vary BPP.

Embodiments of the invention vary beam quality by dynamically changing the position of one or more optical elements in the optical path of the laser beam. In one embodiment, the beam profile is tailored by adjusting the beam pointing position on the optical element. The optical elements may have different geometries dependent on a desired beam profile and, therefore, BPP. One optical element in accordance with embodiments of the invention has a planar surface and a flat-top (i.e., truncated) cone shaped surface. Another optical element in accordance with embodiments of the invention has a planar surface and a flat-top spherical shaped surface. Yet another optical element in accordance with embodiments of the invention is a meniscus lens. The diverging light rays from the beam delivery fiber are directed towards the optical element(s) to redistribute beam intensity within the optical elements. Other optical elements in accordance with embodiments of the invention include paired positive and negative axicon lenses. In other embodiments, optical elements include twinned, complementary phase-plate lenses, one of which has a partially convex surface and one of which has a complementarily partially concavely curved surface. The edges of the optical elements may be rounded off in order to suppress diffraction effects. Generating/transforming laser intensity distribution on workpieces with various beam shaping techniques has been conducted, but such conventional techniques have limited ability to vary beam quality. The advantages of dynamic variation of BPP with the automated movement of optical elements may be applied to, for example, laser-cutting applications on round-cut or square-cut corners where BPP changes during free-form cutting are required. Such advantages may also be applied to laser-drilling applications that may utilize the ability to vary both BPP and focal length. Automated closed-loop motor control of optical elements in accordance with embodiments of the invention produces reliable and repeatable performance and enables precise control of optics position, thereby providing accurate BPP variation.

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as input beams in conjunction with embodiments of the present invention for, e.g., BPP control.

In an aspect, embodiments of the invention feature a laser delivery system for receiving and altering a spatial power distribution of a radiation beam from a beam source and focusing the radiation with the altered spatial power distribution onto a workpiece. The laser system includes or consists essentially of a collimating lens for collimating the radiation beam, a focusing lens for receiving the collimated beam and focusing the beam toward the workpiece, an optical element for receiving the radiation beam and altering the spatial power distribution thereof, a lens manipulation system for changing a position of the optical element within a path of the radiation beam, and a controller for controlling the lens manipulation system to achieve a target altered spatial power distribution on the workpiece. The optical element may be disposed between the beam source and the collimating lens (i.e., optically downstream of the beam source and optically upstream of the collimating lens).

Embodiments of the invention may include one or more of the following in any of a variety of combinations. The optical element may include, consist essentially of, or consist of a lens having (i) a first surface having the shape of a truncated cone, and (ii) opposite the first surface, a second surface that is substantially planar. The first surface may face the beam source. The first surface may face away from the beam source. The optical element may include, consist essentially of, or consist of a lens having (i) a first surface having the shape of a truncated sphere, and (ii) opposite the first surface, a second surface that is substantially planar. The first surface may face the beam source. The first surface may face away from the beam source. The optical element may include, consist essentially of, or consist of a meniscus lens. The meniscus lens may be a positive meniscus lens. The meniscus lens may be a negative meniscus lens. The optical element may include, consist essentially of, or consist of fused silica and/or zinc sulfide. The lens manipulation system may be configured to position the optical element transversely off-center within the path of the radiation beam.

The laser delivery system may include a second optical element disposed in the path of the radiation beam. The second optical element may be disposed between the focusing lens and the workpiece (i.e., disposed optically downstream of the focusing lens and disposed optically upstream of the workpiece). The lens manipulation system may be configured to change a position of the second optical element within the path of the radiation beam. The second optical element may include, consist essentially of, or consist of a lens having (i) a first surface having the shape of a truncated cone, and (ii) opposite the first surface, a second surface that is substantially planar. The first surface may face the beam source. The first surface may face away from the beam source. The second optical element may include, consist essentially of, or consist of a lens having (i) a first surface having the shape of a truncated sphere, and (ii) opposite the first surface, a second surface that is substantially planar. The first surface may face the beam source. The first surface may face away from the beam source. The second optical element may include, consist essentially of, or consist of a meniscus lens. The meniscus lens may be a positive meniscus lens. The meniscus lens may be a negative meniscus lens. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

In another aspect, embodiments of the invention feature a laser delivery system for receiving and altering a spatial power distribution of a radiation beam from a beam source and focusing the radiation with the altered spatial power distribution onto a workpiece. The laser delivery system includes or consists essentially of a collimating lens for collimating the radiation beam, a focusing lens for receiving the collimated beam and focusing the beam toward the workpiece, first and second optical elements for receiving the radiation beam and altering the spatial power distribution thereof, a lens manipulation system for changing (i) a position of the first optical element within a path of the radiation beam, (ii) a position of the second optical element within the path of the radiation beam, and/or (iii) a distance between the first and second optical elements, and a controller for controlling the lens manipulation system to achieve a target altered spatial power distribution on the workpiece. The first and/or second optical element may be disposed between the beam source and the collimating lens (i.e., disposed optically downstream of the beam source and optically upstream of the collimating lens).

Embodiments of the invention may include one or more of the following in any of a variety of combinations. The first optical element may include, consist essentially of, or consist of a double-concave axicon lens. The second optical element may include, consist essentially of, or consist of a double-convex axicon lens. The first optical element may be disposed optically upstream of the second optical element. The first optical element may be disposed optically downstream of the second optical element. The lens manipulation system may be configured to change the distance between the first and second optical elements within the range of approximately 0 mm to approximately 50 mm, within the range of approximately 0 mm to approximately 20 mm, within the range of approximately 2 mm to approximately 50 mm, or with the range of approximately 2 mm to approximately 20 mm. The first optical element may include, consist essentially of, or consist of a lens having (i) a first surface that is substantially planar, and (ii) opposite the first surface, a second surface having (a) a first portion that is convexly curved and (b) a second portion that is substantially planar. The second optical element may include, consist essentially of, or consist of a lens having (i) a first surface that is substantially planar, and (ii) opposite the first surface, a second surface having (a) a first portion that is concavely curved and (b) a second portion that is substantially planar. The first optical element may be disposed optically upstream of the second optical element. The first optical element may be disposed optically downstream of the second optical element. The second surface of the first optical element may face the second surface of the second optical element. The first surface of the first optical element may face the first surface of the second optical element. The first surface of the first optical element may face the second surface of the second optical element. The second surface of the first optical element may face the first surface of the first optical element. The lens manipulation system may be configured to position the first optical element and/or the second optical element transversely off-center within the path of the radiation beam. The first optical element may include, consist essentially of, or consist of fused silica and/or zinc sulfide. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

In yet another aspect, embodiments of the invention feature a laser delivery system for receiving and altering a spatial power distribution of a radiation beam from a beam source and focusing the radiation with the altered spatial power distribution onto a workpiece. The laser delivery system includes or consists essentially of one or more divergence-increasing optical elements for increasing a divergence of the radiation beam, a focusing lens for receiving the radiation beam and focusing the beam toward the workpiece, at least one optical element for receiving the radiation beam and altering the spatial power distribution thereof, a lens manipulation system for changing a position of the at least one optical element within a path of the radiation beam, and a controller for controlling the lens manipulation system to achieve a target altered spatial power distribution on the workpiece.

Embodiments of the invention may include one or more of the following in any of a variety of combinations. The focusing lens may be disposed optically downstream of the one or more divergence-increasing optical elements. The at least one optical element may be disposed optically upstream of the focusing lens. The one or more divergence-increasing optical elements may include, consist essentially of, or consist of a triple collimator. The triple collimator may include, consist essentially of, or consist of (i) a first plano-concave lens, (ii) a second meniscus lens, and (iii) a third plano-convex lens. The first plano-concave lens may be disposed optically upstream of the second meniscus lens. The second meniscus lens may be disposed optically upstream of the third plano-convex lens. The at least one optical element may be disposed optically downstream of the first plano-concave lens. The at least one optical element may be disposed optically upstream of the second meniscus lens and/or the third plano-convex lens. The at least one optical element may include, consist essentially of, or consist of a lens having (i) a first surface having the shape of a truncated cone, and (ii) opposite the first surface, a second surface that is substantially planar. The at least one optical element may include, consist essentially of, or consist of a lens having (i) a first surface having the shape of a truncated sphere, and (ii) opposite the first surface, a second surface that is substantially planar. The at least one optical element may include, consist essentially of, or consist of a meniscus lens (e.g., a positive meniscus lens or a negative meniscus lens). The lens manipulation system may be configured to position at least one said optical element transversely off-center within the path of the radiation beam.

The at least one optical element may include, consist essentially of, or consist of a first optical element and a second optical element. The first optical element and the second optical element may be separated by a gap therebetween. The lens manipulation system may be configured to change (i) a position of the first optical element within a path of the radiation beam, (ii) a position of the second optical element within the path of the radiation beam, and/or (iii) a distance between the first and second optical elements. The first optical element may include, consist essentially of, or consist of a double-concave axicon lens. The second optical element may include, consist essentially of, or consist of a double-convex axicon lens. The first optical element may be disposed optically upstream of the second optical element. The first optical element may be disposed optically downstream of the second optical element. The lens manipulation system may be configured to change the distance between the first and second optical elements within the range of approximately 0 mm to approximately 50 mm, within the range of approximately 0 mm to approximately 20 mm, within the range of approximately 2 mm to approximately 50 mm, or with the range of approximately 2 mm to approximately 20 mm. The first optical element may include, consist essentially of, or consist of a lens having (i) a first surface that is substantially planar, and (ii) opposite the first surface, a second surface having (a) a first portion that is convexly curved and (b) a second portion that is substantially planar. The second optical element may include, consist essentially of, or consist of a lens having (i) a first surface that is substantially planar, and (ii) opposite the first surface, a second surface having (a) a first portion that is concavely curved and (b) a second portion that is substantially planar. The first optical element may be disposed optically upstream of the second optical element. The first optical element may be disposed optically downstream of the second optical element. The second surface of the first optical element may face the second surface of the second optical element. The first surface of the first optical element may face the first surface of the second optical element. The first surface of the first optical element may face the second surface of the second optical element. The second surface of the first optical element may face the first surface of the first optical element. The lens manipulation system may be configured to position the first optical element and/or the second optical element transversely off-center within the path of the radiation beam. The first optical element may include, consist essentially of, or consist of fused silica and/or zinc sulfide. The second optical element may include, consist essentially of, or consist of fused silica and/or zinc sulfide.

The beam source may include or consist essentially of a beam emitter emitting a plurality of discrete beams, focusing optics for focusing the plurality of beams onto a dispersive element, a dispersive element for receiving and dispersing the received focused beams, and a partially reflective output coupler positioned to receive the dispersed beams, transmit a portion of the dispersed beams therethrough as the radiation beam, and reflect a second portion of the dispersed beams back toward the dispersive element. The radiation beam may be composed of multiple wavelengths of radiation. The focusing optics may include or consist essentially of one or more cylindrical lenses, one or more spherical lenses, one or more spherical mirrors, and/or one or more cylindrical mirrors. The dispersive element may include or consist essentially of a diffraction grating (e.g., a transmissive diffraction grating or a reflective diffraction grating).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
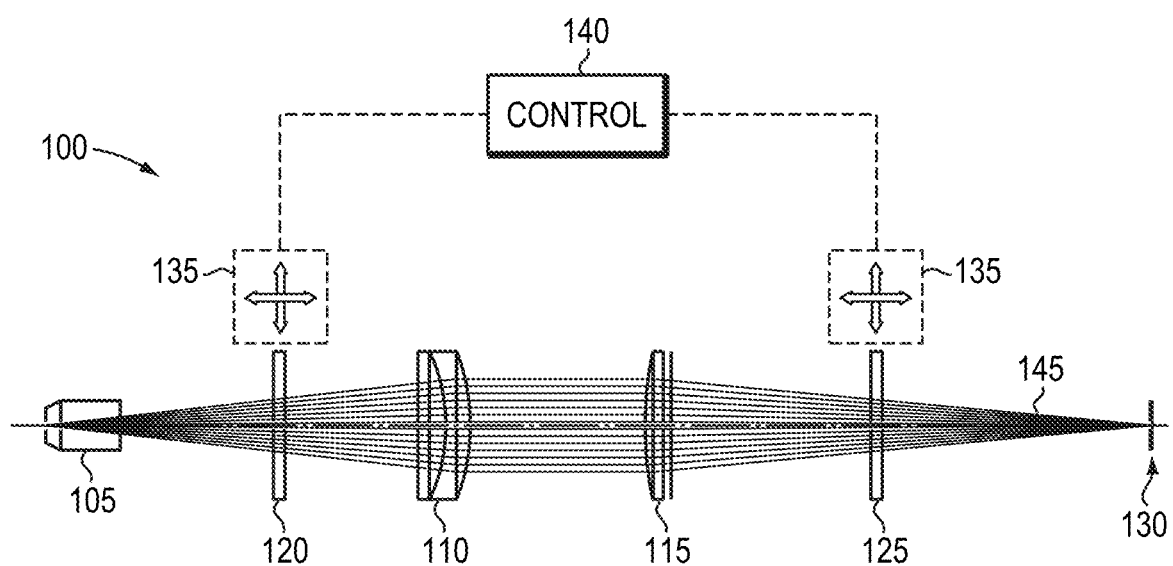
FIG. 1 is a schematic diagram of a laser beam delivery system in accordance with various embodiments of the invention.

FIG. 1 depicts a schematic diagram of a laser beam delivery system 100 incorporating beam-manipulating optical elements in accordance with embodiments of the present invention. In various embodiments, the laser beam delivery system 100 may be disposed within, for example, a laser-based cutting head or welding head. The beam delivery system 100 features a beam delivery fiber, terminating in a fiber end cap 105, that is connected to remaining portions of the laser-generating system (for example, a WBC laser system, not shown in FIG. 1), a collimating lens 110, a focusing lens 115, and an optical element 120 that is positioned between the end cap 105 and the collimating lens 110. In various embodiments, the optical element 120 is disposed close to the fiber end cap 105 to minimize the size of the beam striking the optical element 120. Refraction of a smaller beam may be performed with optics having smaller geometric dimensions of the optics and may vary the output profile with more sensitivity. FIG. 1 also depicts an optional second optical element 125 disposed between the focusing lens 115 and a workpiece 130. The workpiece 130 may include or consist essentially of, for example, one or more parts (e.g., metallic parts) to be welded, drilled, and/or cut by the beam focused by focusing lens 115. In various embodiments, the first optical element 120 is disposed between the focusing lens 115 and the workpiece 130 and the second optical element 125 is omitted. Optical elements 120, 125 may each include or consist essentially of, for example, a phase plate.

The positions of first optical element 120 and/or second optical element 125 may be translated within the beam profile via use of a lens manipulation system that may include or consist essentially of, for example, one or more mechanized or motorized translation stages 135 capable of motion along two or three axes. The lens manipulation system may be responsive to a controller 140. The controller 140 may be responsive to a desired target radiation power distribution and/or BPP or other measure of beam quality (e.g., input by a user and/or based on one or more properties of a workpiece to be processed such as the distance to the workpiece, the composition of the workpiece, topography of the workpiece, etc.) and configured to position optical element 120 and/or optical element 125 to cause the manipulated beam 145 to strike the workpiece 130 with the target radiation power distribution or beam quality. The controller 140 may be programmed to achieve the desired power distribution and/or output BPP and/or beam quality via a particular optical element positioning as detailed herein. The controller 140 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Figure 2:
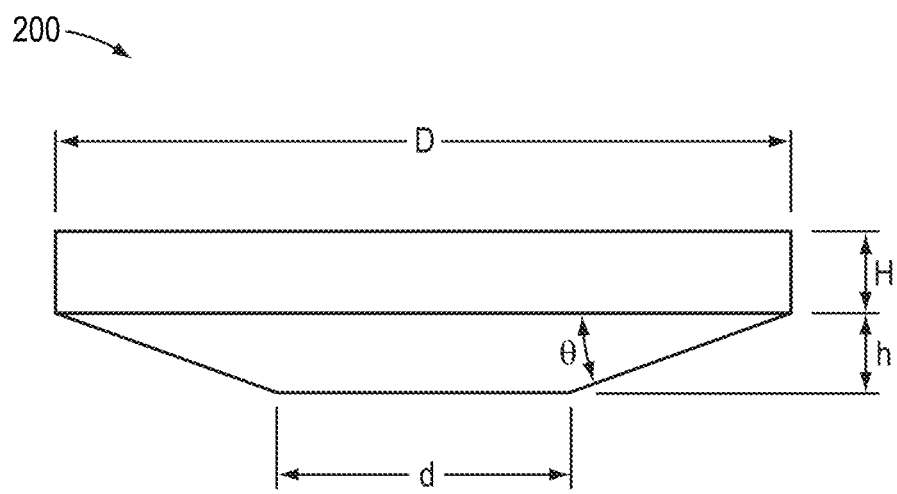
FIG. 2 is a schematic diagram of a flat-top cone optical element in accordance with various embodiments of the invention.

FIG. 2 is a schematic diagram of an optical element 200 having the shape of a truncated cone (flat-top cone shape or tapered cylinder shape) in accordance with embodiments of the invention. For example, optical element 200 may be utilized as optical element 120 and/or optical element 125 in delivery system 100. The parameters D, d, θ, and H are geometrical design parameters for outside diameter, inside diameter (which may correspond to the beam size of the beam when it strikes the optical element), slope angle which defines the maximum sagitta (or "sag," h) and the separation of outer ring of the beam from the spot center of the beam, and the thickness of the optical element 200, respectively. Ray tracing of geometric optics may be used to design optical elements in accordance with embodiments of the present invention based on the conservation of energy, the constancy of optical path length and Snell's law. The lens design and its surface profiles may, for example, transform the beam profile from a Gaussian into a Bessel laser beam with a desired intensity distribution.

Table 1 provides exemplary design values for exemplary optical elements 200 including, consisting essentially of, or consisting of two different materials, fused silica and zinc sulfide (e.g., ZnS MultiSpectral, available from II-VI Inc. of Saxonburg, Pa.).

TABLE 1

| Optical Element Material | Fused Silica | Zinc Sulfide |
|---|---|---|
| D (mm) | 25 | 25 |
| d (mm) | 8 | 8 |
| H (mm) | 2 | 0.85 |

TABLE 1-continued

| Optical Element Material | Fused Silica | Zinc Sulfide |
|---|---|---|
| h (μm) | 50 | 17 |
| Θ (mrad) | 5.9 | 2 |

Figure 3A:
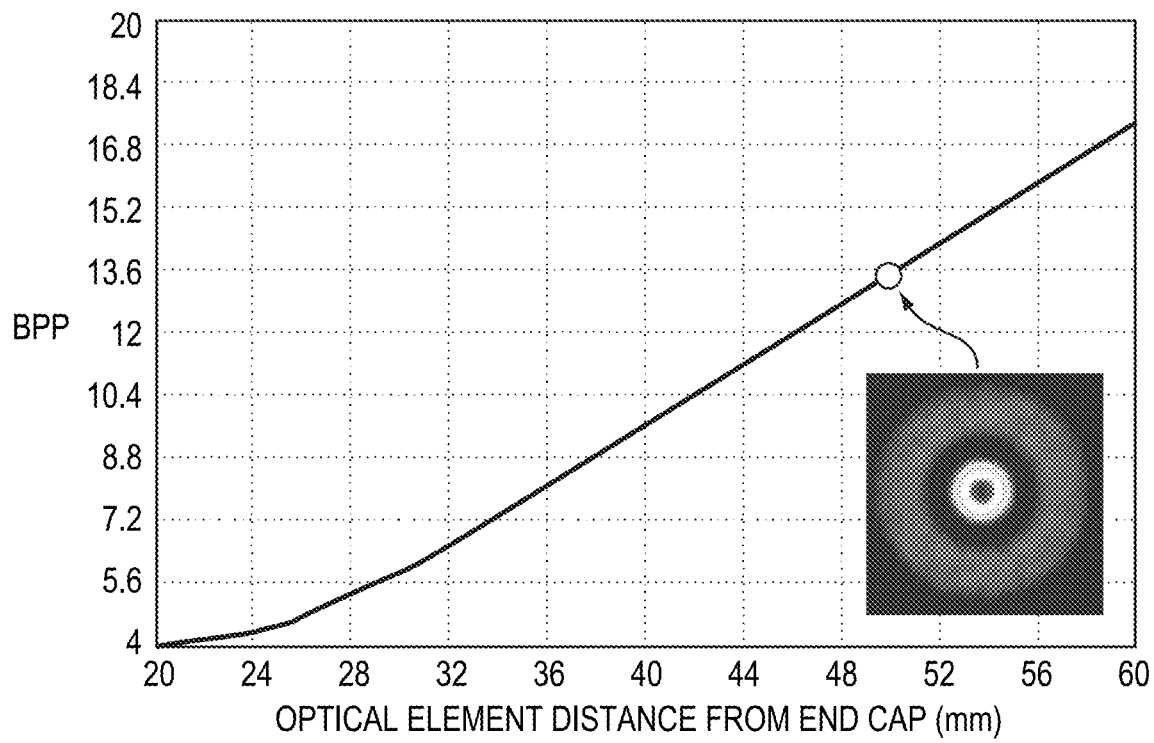
FIG. 3A is a graph of BPP variation as a function of the distance of a fused silica flat-top cone optical element from a beam source in accordance with various embodiments of the invention.
Figure 3B:
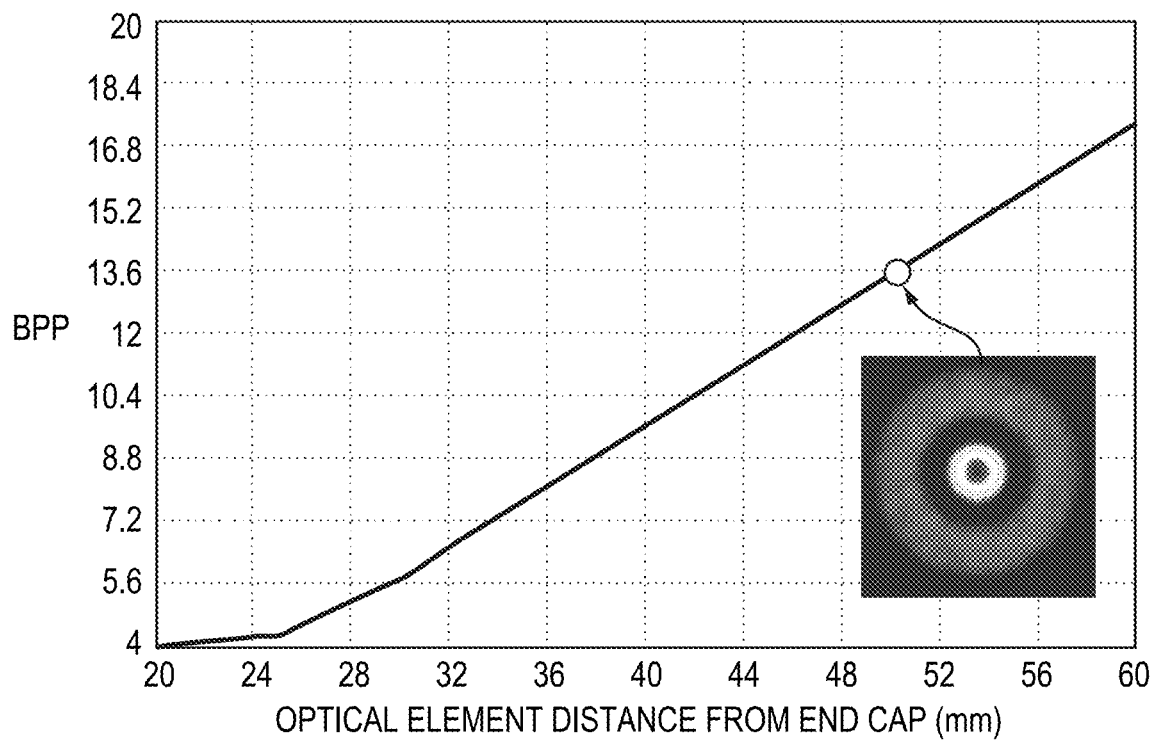
FIG. 3B is a graph of BPP variation as a function of the distance of a zinc sulfide flat-top cone optical element from a beam source in accordance with various embodiments of the invention.

FIGS. 3A and 3B are graphs of BPP at different distances from the fiber end cap 105 to the exemplary fused silica (FIG. 3A) and zinc sulfide (FIG. 3B) optical elements 200 having the design parameters provided in Table 1. In the plots, the initial position of the optical element 200 is assumed to be 25 mm from the end cap 105. As shown, in both cases, the BPP of the beam may be increased from about 4 to about 12 via displacement of the optical element 200 by approximately 30 mm. The slope of this change in BPP as a function of displacement may be altered via changes in the numerical aperture of the fiber output at the end cap 105. The beam profiles at a 50 mm distance of the optical element 200 to the fiber end cap 105 are also shown in FIGS. 3A and 3B.

Figure 4A:
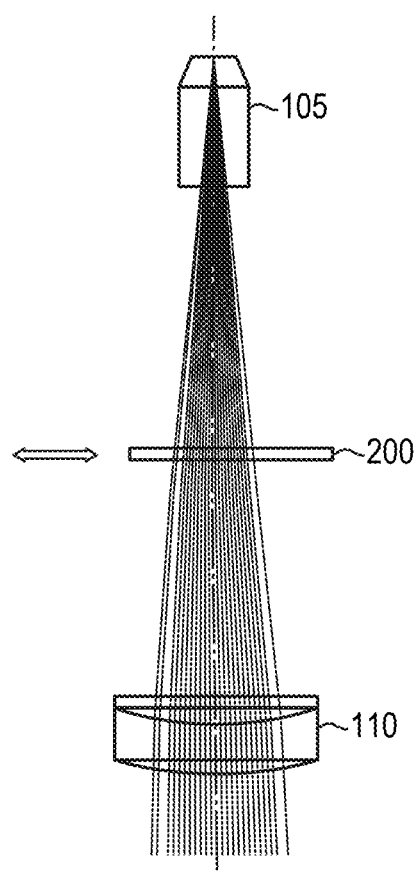
FIG. 4A is a schematic diagram of a laser delivery system having an off-center optical element in accordance with various embodiments of the invention.
Figures 4B, 4C, 4D:
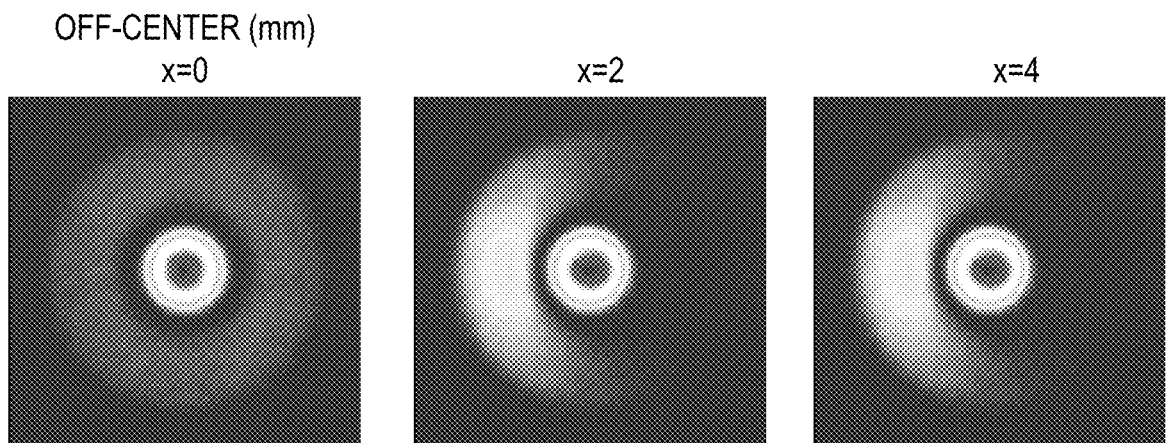
FIGS. 4B-4D depict beam profiles as a function of off-center distance produced by the laser delivery system of FIG. 4A.
Figure 4E:
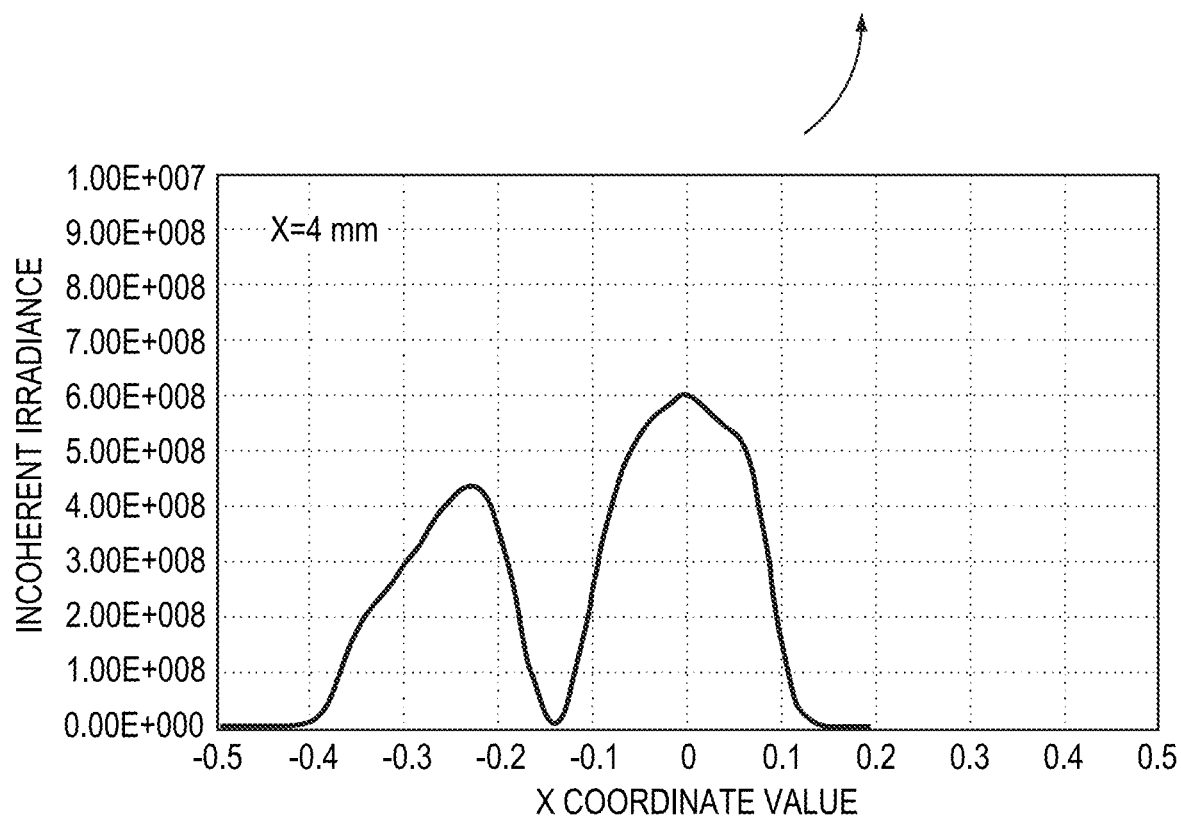
FIG. 4E is a graph of irradiance as a function of position for the two-peak beam profile depicted in FIG. 4D.

A tailored beam profile that has two peaks in one axis may be obtained by positioning the optical element 200 (or other optical elements detailed herein) transversely off-center in the beam path (i.e., partially introducing it into the input laser beam) as shown in FIG. 4A. Depending on the degree of introduction, the beam profile of the output laser beam may be optimally adapted to a variety of laser applications. In FIGS. 4B-4D, the beam profiles at different off-centered distances (0 mm, 2 mm, and 4 mm) for optical element 200 at a 40 mm distance to the end cap 105 are shown. FIG. 4E is a graph of irradiance as a function of position for the beam profile depicted in FIG. 4D, clearly showing the two-peak nature of the beam profile. In various embodiments, the variation of BPP at different off-centered positions of the optical element 200 is approximately zero, even while the irradiance as a function of position across the beam profile changes.

Figure 5:
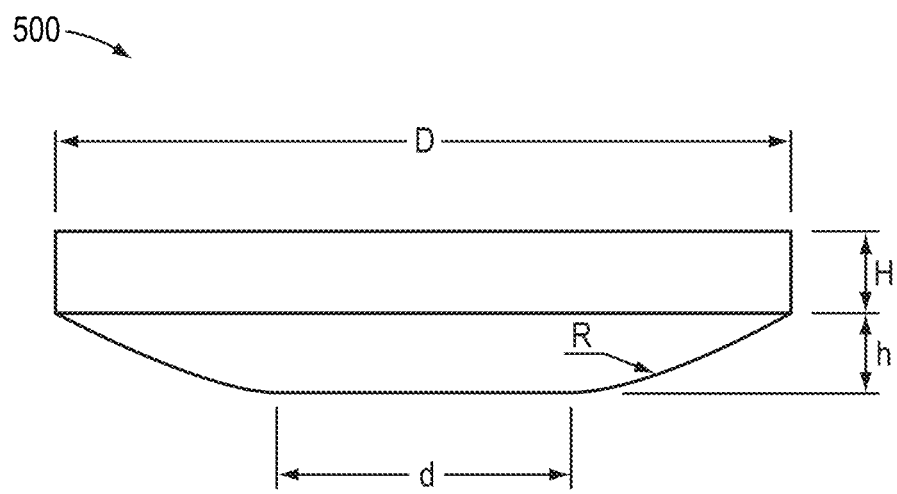
FIG. 5 is a schematic diagram of a flat-top spherical optical element in accordance with various embodiments of the invention.

Optical elements in accordance with embodiments of the invention may also have a truncated spherical (i.e., flat-top spherical) configuration and may be used to also produce a Bessel beam profile. The geometric design for optical elements 500 in accordance with such embodiments is depicted schematically in FIG. 5. Optical element 500 may be utilized as optical element 120 and/or optical element 125 in delivery system 100. The design parameters are the same as those detailed above for the flat-top cone optical element 200 except for the curvature radius R, which also defines the maximum sag (h) and the separation of the resulting annular beam ring from the beam spot center.

Table 2 provides exemplary design values for exemplary optical elements 500 including, consisting essentially of, or consisting of two different materials, fused silica and zinc sulfide.

TABLE 2

| Optical Element Material | Fused Silica | Zinc Sulfide |
|---|---|---|
| D (mm) | 25 | 25 |
| d (mm) | 8 | 8 |
| H (mm) | 2 | 0.85 |
| h (μm) | 58 | 23 |
| R (mm) | 1200 | 3000 |

Figure 6A:
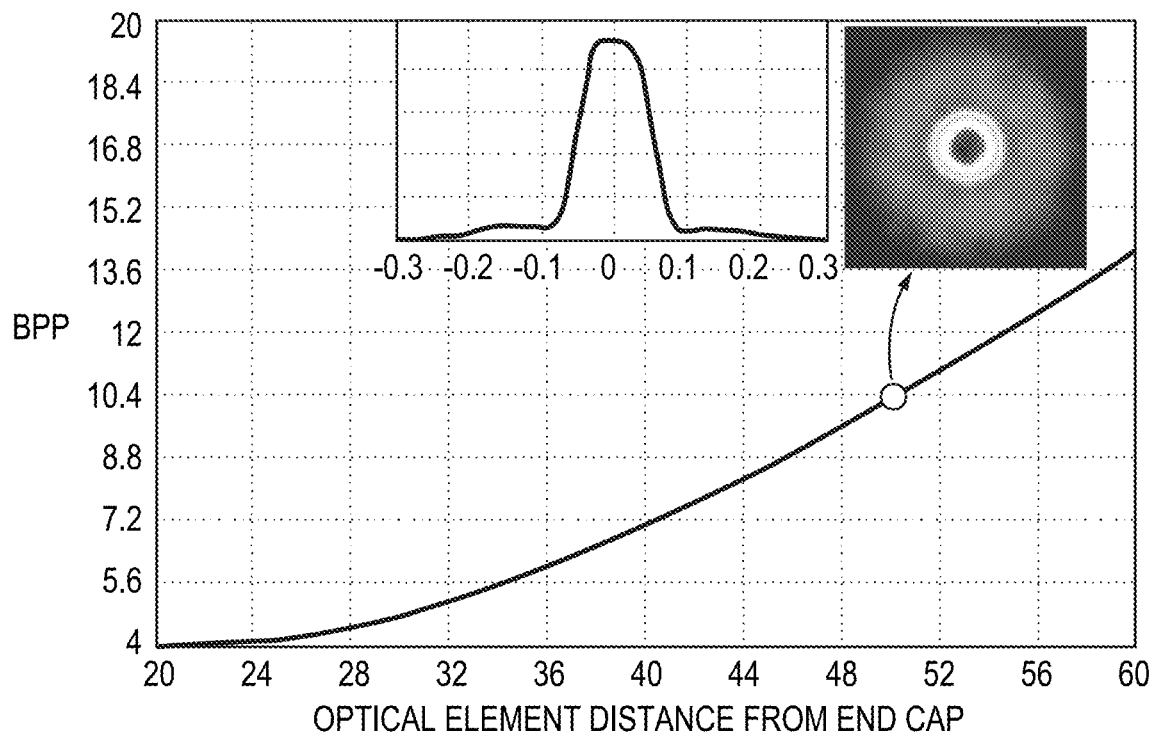
FIG. 6A is a graph of BPP variation as a function of the distance of a fused silica flat-top spherical optical element from a beam source in accordance with various embodiments of the invention.
Figure 6B:
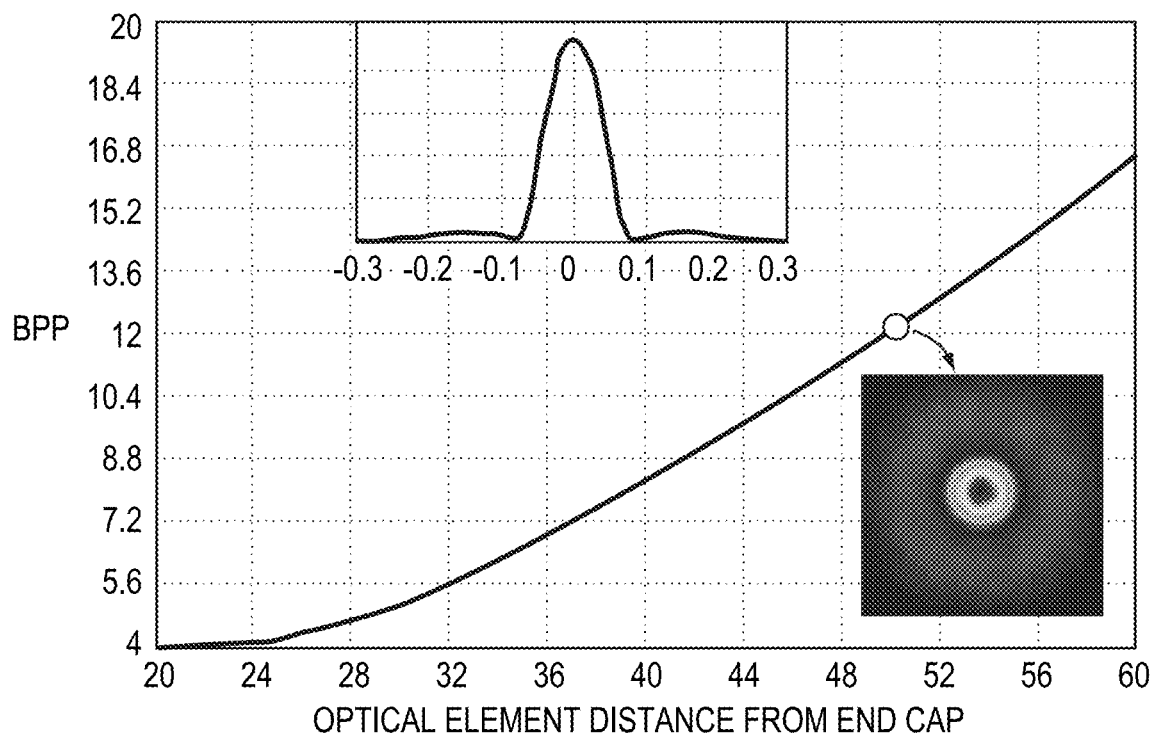
FIG. 6B is a graph of BPP variation as a function of the distance of a zinc sulfide flat-top spherical optical element from a beam source in accordance with various embodiments of the invention.

FIGS. 6A and 6B are graphs of BPP at different distances from the fiber end cap 105 to the exemplary fused silica (FIG. 6A) and zinc sulfide (FIG. 6B) optical elements 500 having the design parameters provided in Table 2. In the plots, the initial position of the optical element 500 is assumed to be 25 mm from the end cap 105. As shown, in both cases, the BPP of the beam may be increased from about 4 to about 12 via displacement of the optical element 500 by approximately 30 mm (e.g., approximately 28 mm-approximately 32 mm). The slope of this change in BPP as a function of displacement may be altered via changes in the numerical aperture of the fiber output at the end cap 105. The beam profiles at a 50 mm distance of the optical elements 500 to the fiber end cap 105 are also shown in FIGS. 6A and 6B, as are graphs of their irradiance as a function of position for the 50 mm spacing between optical element 500 and end cap 105.

Figures 7A, 7B, 7C:
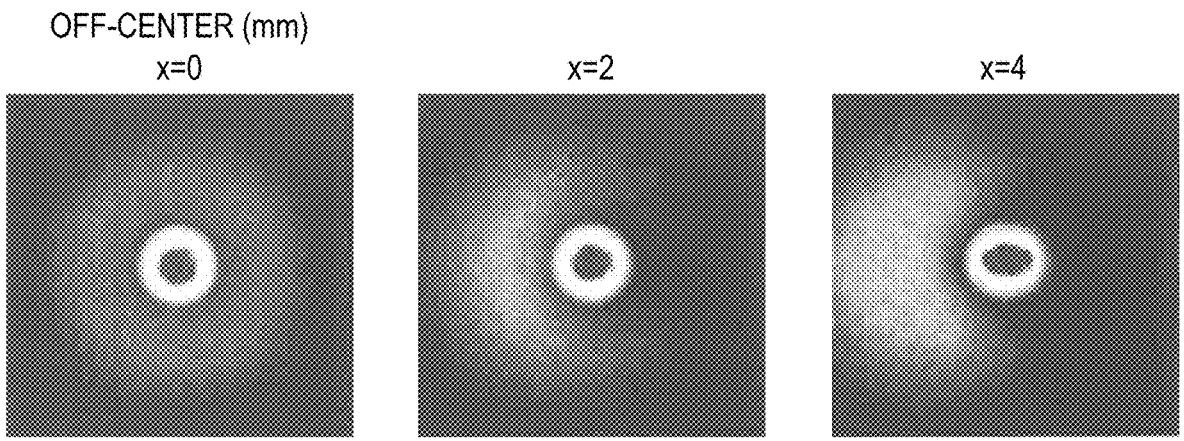
FIGS. 7A-7C depict beam profiles as a function of off-center distance produced by a laser delivery system incorporating the optical element of FIG. 5 in accordance with various embodiments of the invention.
Figure 7D:
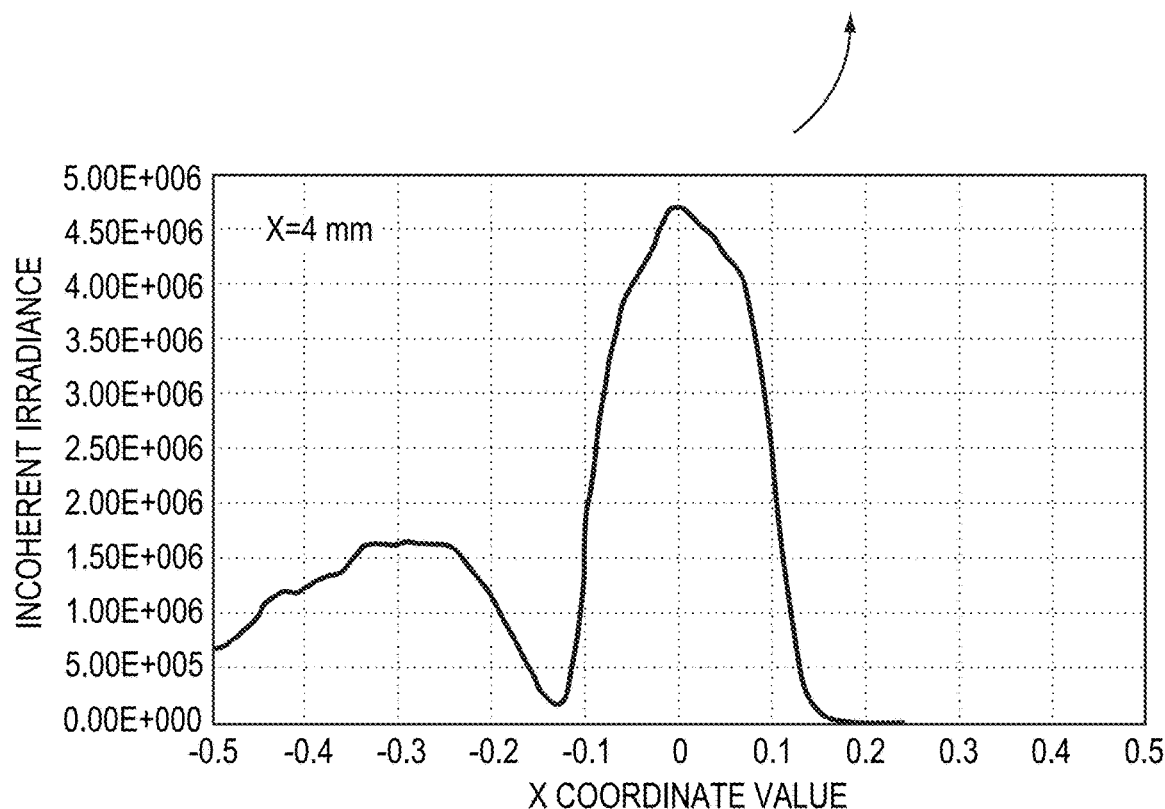
FIG. 7D is a graph of irradiance as a function of position for the two-peak beam profile depicted in FIG. 7C.

In FIGS. 7A-7C, the beam profiles at different off-centered distances (0 mm, 2 mm, and 4 mm) for optical element 500 (i.e., as shown for optical element 200 in FIG. 4A) at a 40 mm distance to the end cap 105 are shown. FIG. 7D is a graph of irradiance as a function of position for the beam profile depicted in FIG. 7C, clearly showing the two-peak nature of the intensity of the beam profile. In various embodiments, the variation of BPP at different off-centered positions of the optical element 500 is approximately zero, even while the irradiance as a function of position across the beam profile changes.

Figure 8A:
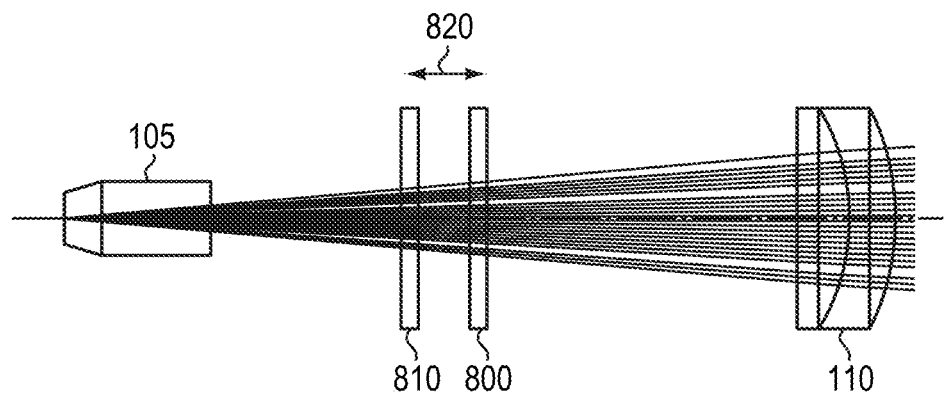
FIG. 8A is a schematic diagram of a portion of a laser delivery system having two axicon-lens optical elements in accordance with various embodiments of the invention.
Figure 8B:
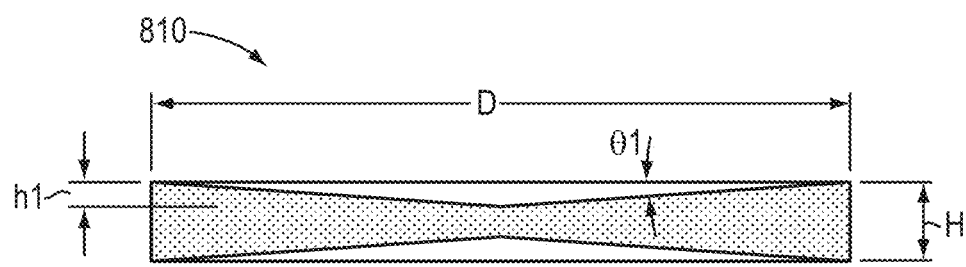
FIGS. 8B and 8C depict geometric design parameters of axicon lenses in accordance with various embodiments of the invention.
Figure 8C:
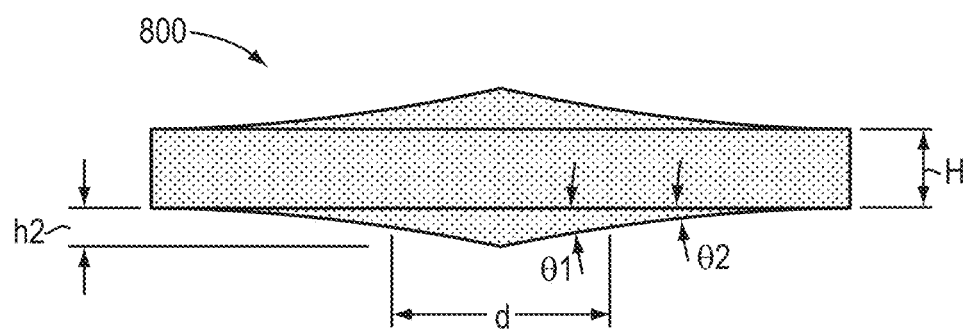

Embodiments of the invention utilize optical elements to produce annular beam shapes. Embodiments of the invention feature one or more optical elements that include, consist essentially of, or consist of axicon lenses. As known in the art, axicon lenses are lenses having at least one conical surface, and such lenses may be utilized to image a point source into a line segment along the optical axis. The conical surface of revolution is capable of blending light from a point source, which is located on the axis of revolution, by reflection or refraction, or both. Embodiments of the invention utilize a combination of a double-positive (i.e., double convex) axicon lens 800 and a double-negative (i.e., double concave) axicon lens 810 between the fiber end cap 105 and the collimating lens 110 as shown in FIG. 8A, and the beam size at the workpiece may be varied utilizing this lensing system. As shown, lenses 800, 810 are separated in the beam path by a gap distance 820. θ1 and θ2 are the slope variables of the conic surfaces that define the maximum sags (h1 and h2) and the separation of the annular beam ring from the beam spot center as schematically drawn in FIGS. 8B and 8C. In various embodiments of the invention, the conical surfaces of one or both of lenses 800, 810 have smooth edges and radii of curvature less than approximately 5 µm.

Figure 9:
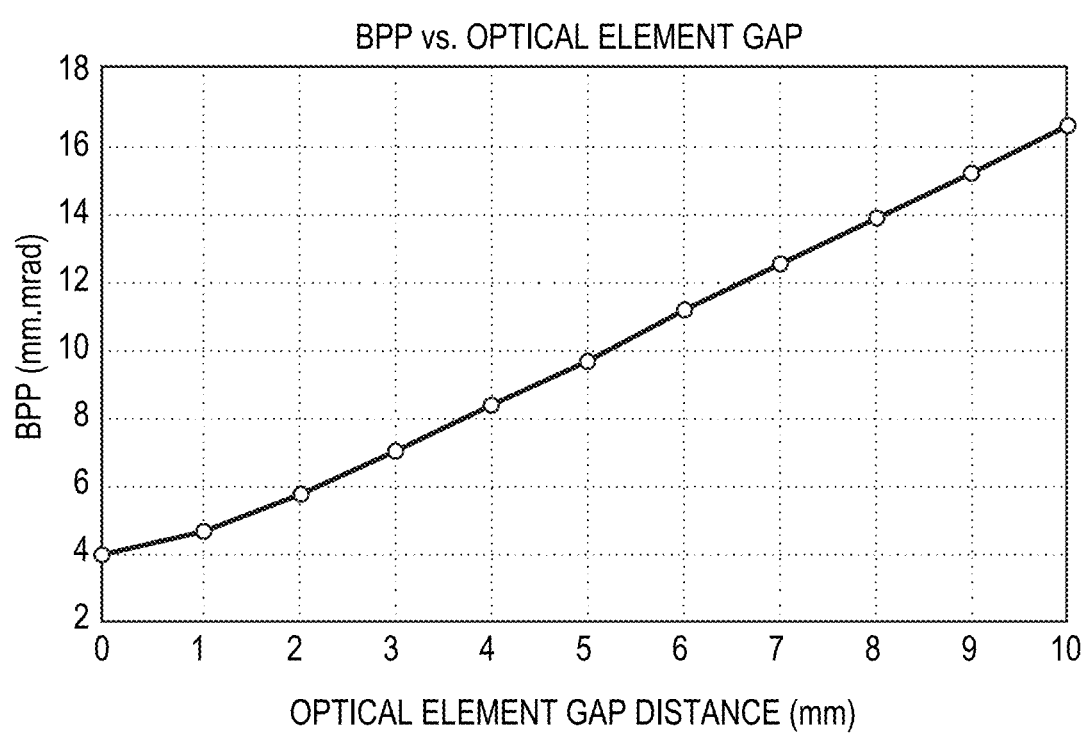
FIG. 9 is a graph of the BPP variation as a function of gap distance between positive and negative axicon lenses in accordance with various embodiments of the invention.
Figure 10:
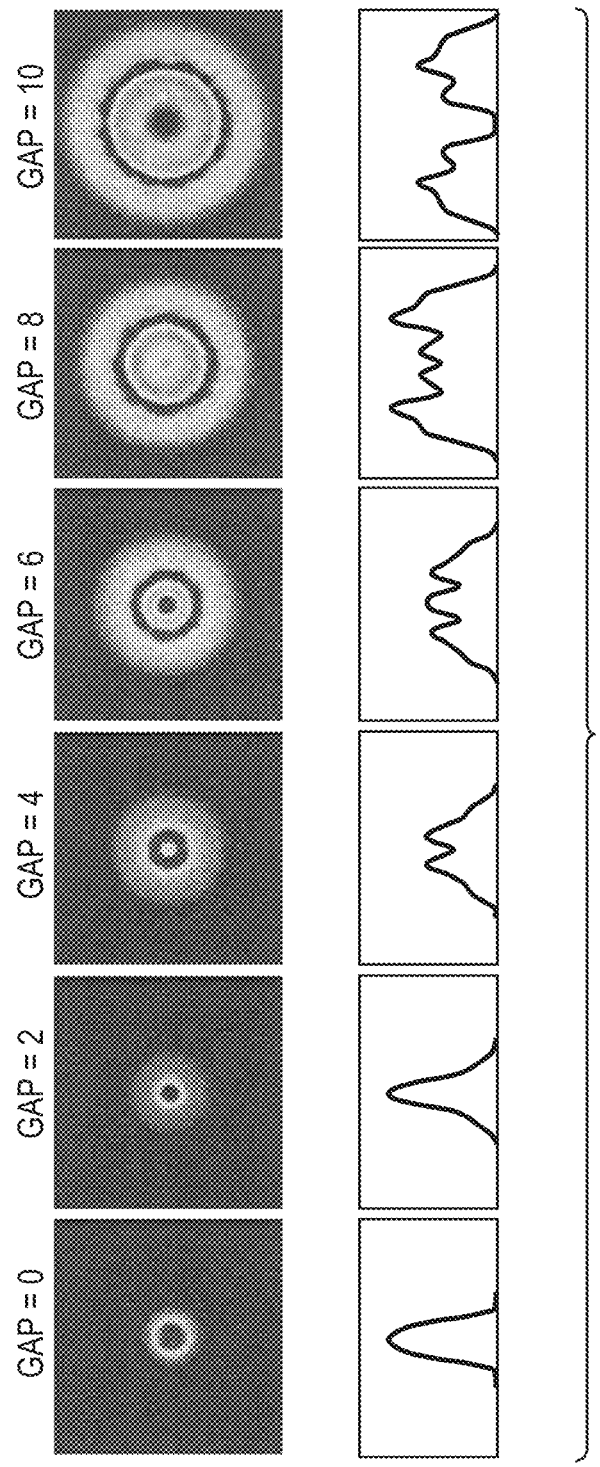
FIG. 10 depicts beam profiles at different gap distances between positive and negative axicon lenses in accordance with various embodiments of the invention.
Figure 11:
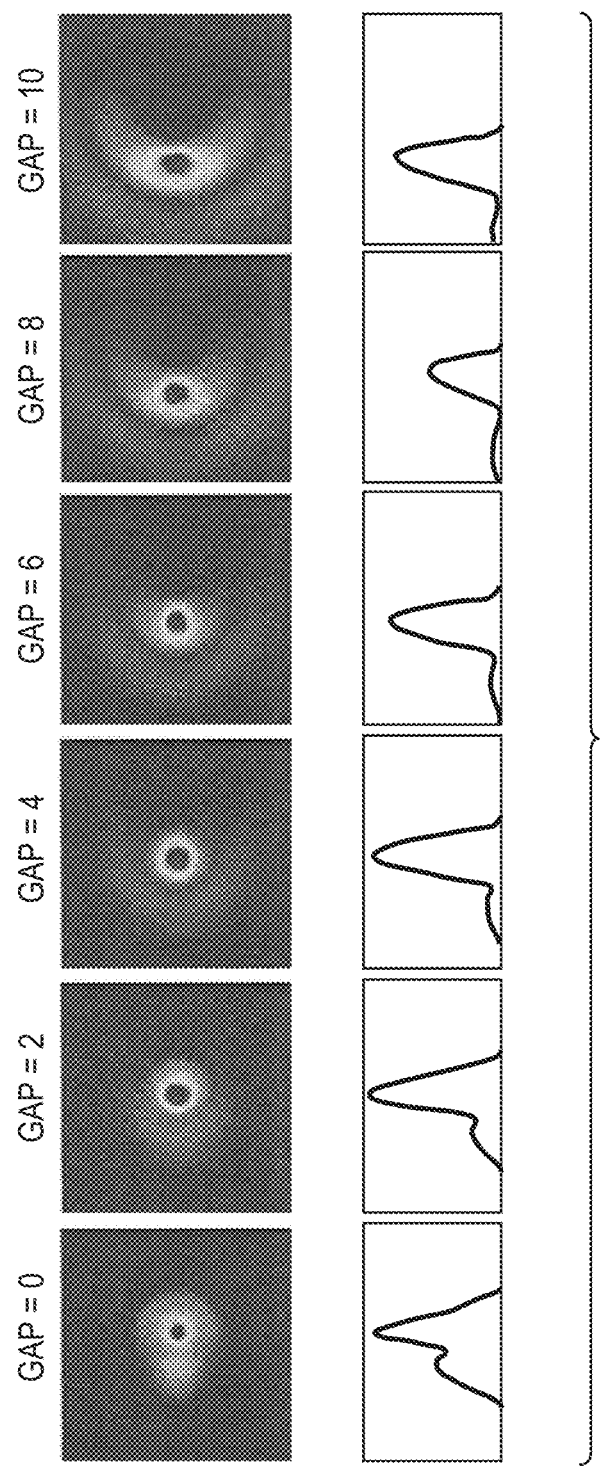
FIG. 11 depicts beam profiles at different gap distances between positive and negative axicon lenses that are transversely off-centered in the beam path in accordance with various embodiments of the invention.

FIG. 9 is a graph depicting control over the BPP of the laser delivery system as a function of the gap distance 820 between the two axicon lenses 800, 810. As shown in FIG. 9, an approximate 7 mm variation in the gap distance 820 results in a BPP increase from 4 to 12, demonstrating the wide range of BPP control enabled by such embodiments of the present invention. The beam profiles as a function of gap distance 820 between the lenses 800, 810 are shown in FIG. 10, where the gap distances are listed in millimeters. As shown, adjustment of the gap distance 820 may transform a beam profile having a single peak to one having two, three, or more peaks. FIG. 11 depicts similar beam profiles for the case in which the two axicon lenses 800, 810 are transversely off-center by 4 mm in the beam path and separated by the listed gap distances 820 (gap distances are listed in millimeters).

Figure 12A:
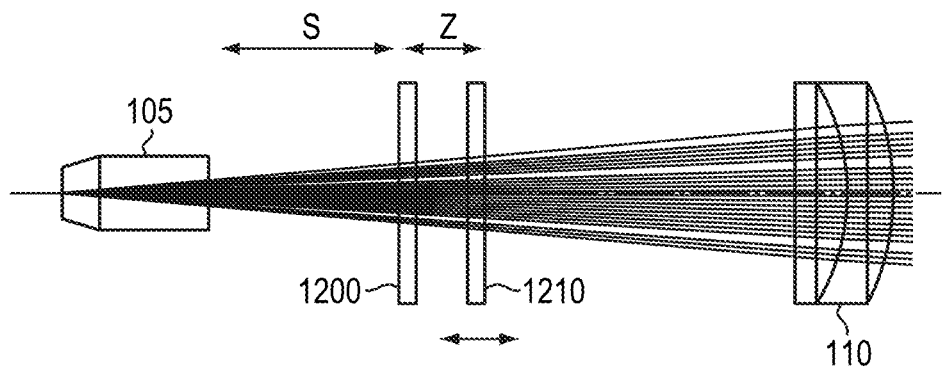
FIG. 12A is a schematic diagram of a portion of a laser delivery system having twin phase plate lenses in accordance with various embodiments of the invention.
Figure 12B:
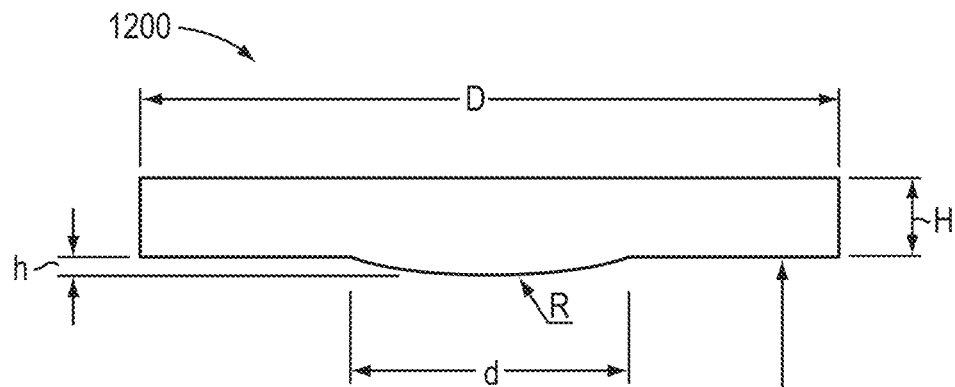
FIGS. 12B and 12C depict geometric design parameters of phase plate lenses in accordance with various embodiments of the invention.
Figure 12C:
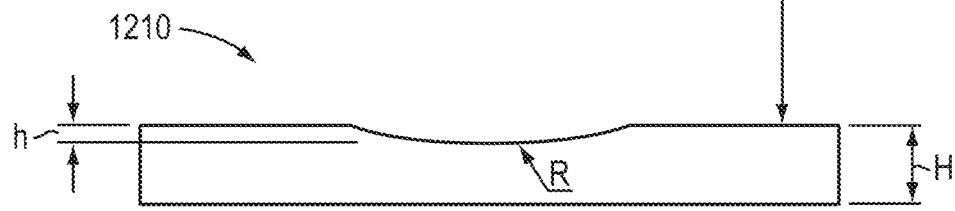

Embodiments of the invention feature one or more optical elements that include, consist essentially of, or consist of phase plates having one planar surface and an opposing surface at least a portion of which is convexly or concavely curved. FIG. 12A depicts a partial beam delivery system featuring two such plates 1200, 1210 separated by a gap Z. As shown, plate 1200 is separated from fiber end cap 105 by a distance S. FIGS. 12B and 12C depict plates 1200, 1210 in more detail. As shown, plates 1200, 1210 have an outer diameter D, and the convex/concave portions of their surfaces have an inner diameter d that defines the maximum sag h (in conjunction with R, detailed below). The thicknesses of the plates at their outer perimeters (i.e., the thicknesses between planar portions of their opposing surfaces) are represented by H, and the radii of curvature of the convex/concave portions are represented by R. As depicted in FIGS. 12B and 12C, the plates 1200, 1210 have approximately the same H, D, d, and R, although various embodiments of the invention feature twin plates (i.e., one having a partial concave surface and one having a partial convex surface) that differ in one or more of those parameters.

Table 3 provides exemplary design values for exemplary optical elements 1200, 1210 including, consisting essentially of, or consisting of two different materials, fused silica and zinc sulfide.

TABLE 3

| Optical Element Material | Fused Silica | Zinc Sulfide |
| --- | --- | --- |
| D (mm) | 25 | 25 |
| d (mm) | 5 | 5 |
| H (mm) | 2 | 1 |
| h (µm) | 25 | 9.3 |
| R (mm) | 500 | 1350 |

Figure 12D:
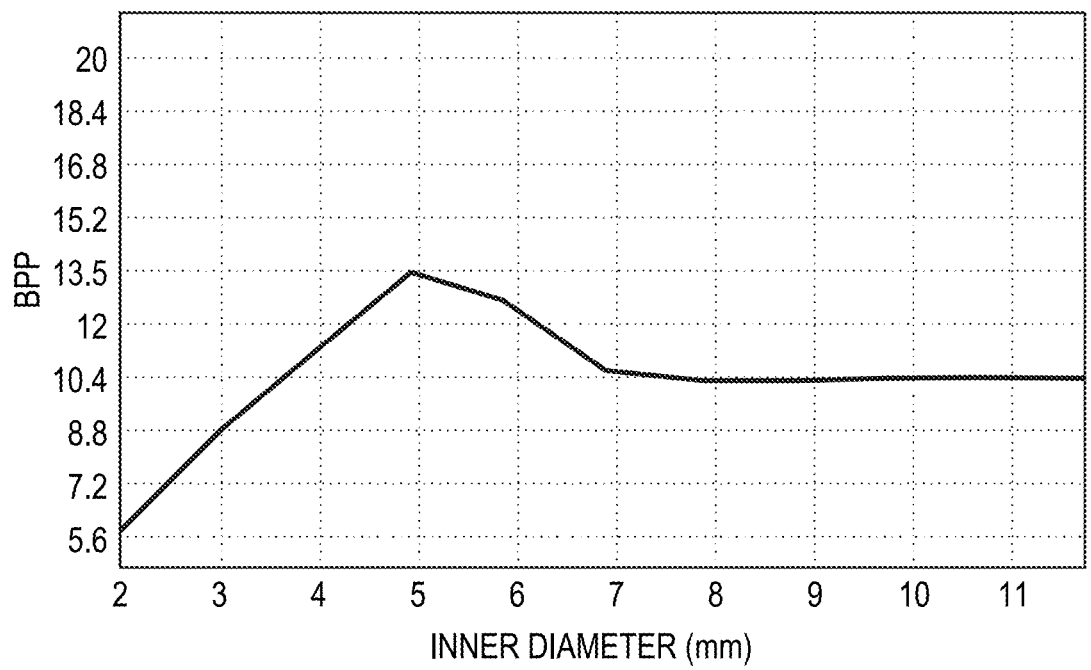
FIG. 12D is a graph of BPP as a function of the inner diameter of twin phase plates in accordance with various embodiments of the invention.
Figure 12E:
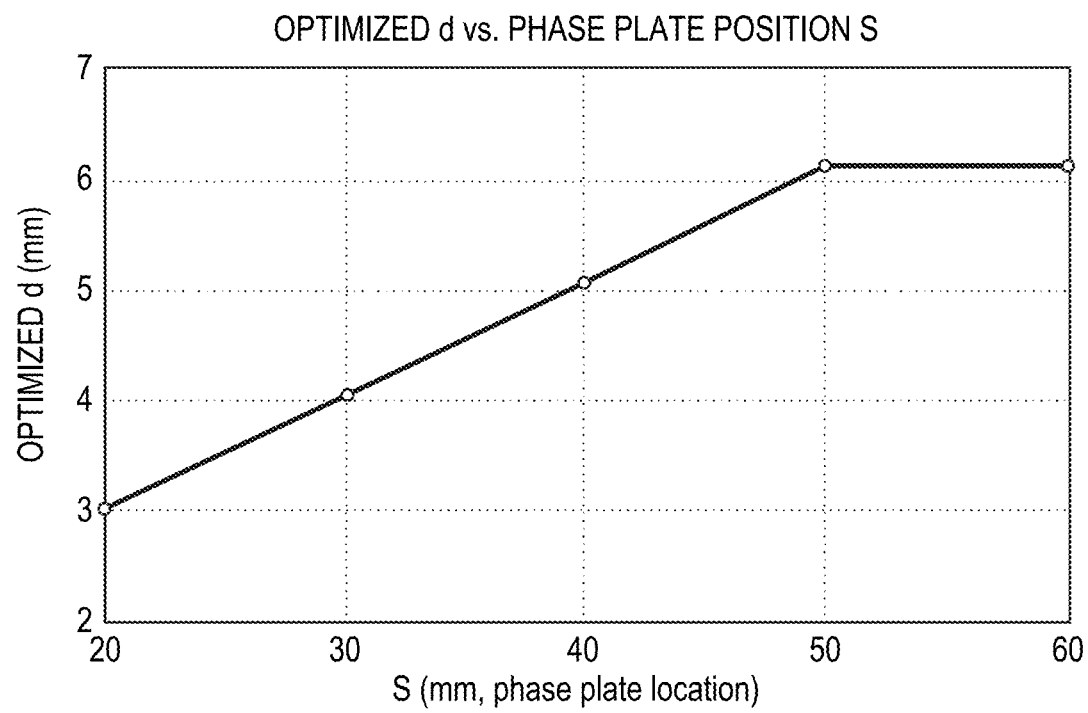
FIG. 12E is a graph of optimized inner diameter of twin phase plates as a function of separation from an input fiber end cap in accordance with various embodiments of the invention.

FIGS. 12D and 12E depict that, in accordance with embodiments of the invention, the inner diameter d of plates 1200, 1210 may be optimized to maximize the output BPP of the laser delivery system as a function of the distance S from the fiber end cap 105. FIG. 12D is a graph of BPP as a function of inner diameter d for plates 1200, 1210 having a distance S of 40 mm, a gap distance Z of 10 mm, and a radius of curvature R of 500. As shown, the resulting BPP is maximized at an inner diameter d of approximately 5 mm; this BPP is substantially independent of changes in the gap distance Z and the radius of curvature R. FIG. 12E is a graph of the optimized inner diameter d (i.e., the inner diameter d that maximizes the output BPP) as a function of the distance S between the end cap 105 and the plate 1200. As shown, an optimized inner diameter d may be selected that maximizes BPP of the output beam as a function of the distance S.

Figure 12F:
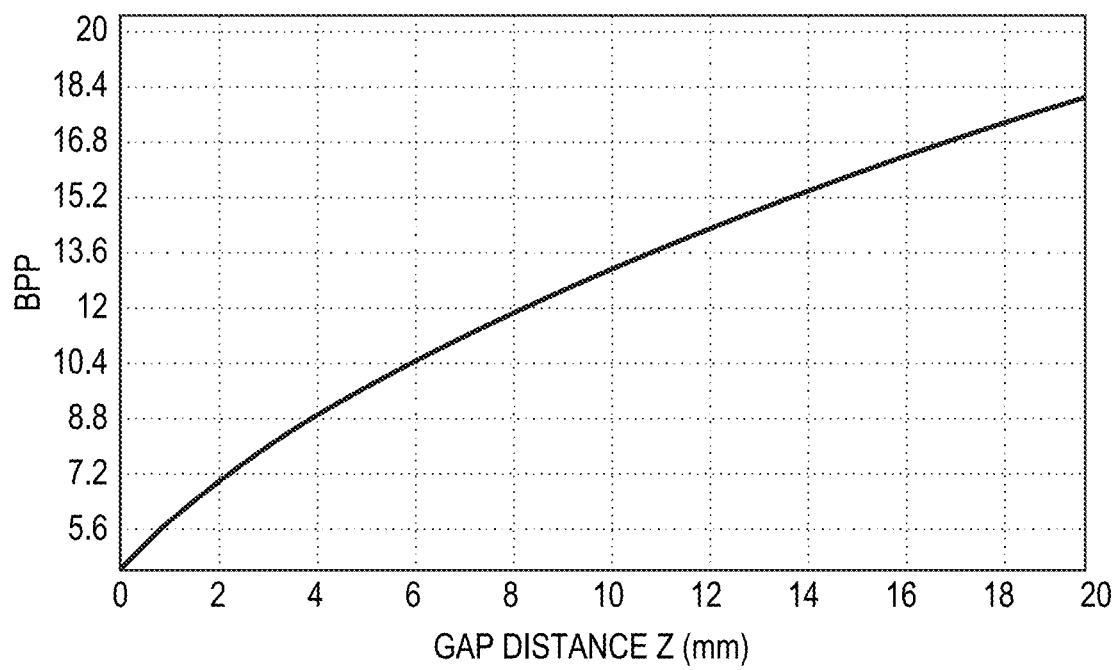
FIG. 12F is a graph of the BPP variation as a function of gap distance between twin phase plate lenses in accordance with various embodiments of the invention.
Figure 12G:
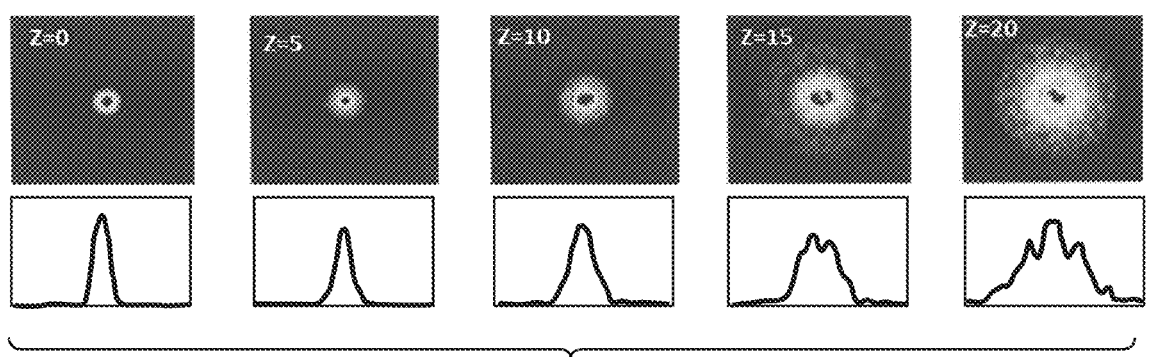
FIG. 12G depicts beam profiles at different gap distances between twin phase plate lenses in accordance with various embodiments of the invention.

FIG. 12F is a graph of BPP at different gap distances Z between plates 1200, 1210 having the design parameters provided in Table 3 (with the design parameters of Table 3, both the fused silica and zinc sulfide plates 1200, 1210 provide the same results). In the plot, the distance S to the end cap 105 is assumed to be 40 mm. As shown, the BPP of the beam may be increased from about 4 to about 12 via alteration of the gap Z between plates 1200, 1210 by approximately 9 mm. Various beam profiles of the output beam as a function of the gap Z (in mm) are illustrated in FIG. 12G, as are graphs of their irradiance as a function of position. As shown, as the beam BPP increases, the beam shape proceeds from having a single peak to having a broader, multi-peak irradiance profile.

Figure 13A:
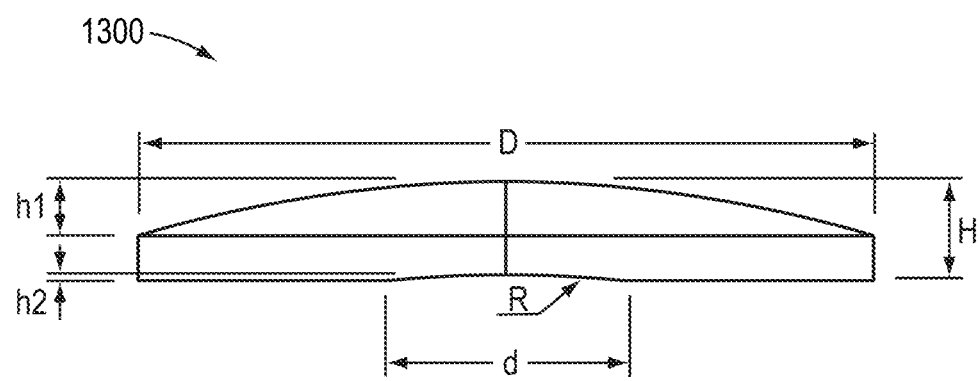
FIG. 13A is a schematic diagram of a meniscus lens optical element in accordance with various embodiments of the invention.

Optical elements in accordance with embodiments of the invention may also include, consist essentially of, or consist of meniscus lenses. The geometric design for optical elements 1300 in accordance with such embodiments is depicted schematically in FIG. 13A; as shown, in various embodiments, one surface of optical element 1300 is convexly curved over substantially the entire surface, while the opposing surface is concavely curved over a portion of the surface, defining an inner diameter d. Optical element 1300 may be utilized as optical element 120 and/or optical element 125 in delivery system 100. As shown, optical element 1300 may have an outer diameter D, inner diameter d, thickness H, maximum sag h1 of the convexly curved surface, and maximum sag h2 of the partially concavely curved surface. The radius of curvature R, which may be approximately the same for both surfaces of optical element 1300, defines the maximum sags h1 and h2, as well as the separation of the resulting annular beam ring from the beam spot center.

Table 4 provides exemplary design values for exemplary optical elements 1300 including, consisting essentially of, or consisting of two different materials, fused silica and zinc sulfide.

TABLE 4

| Optical Element Material | Fused Silica | Zinc Sulfide |
|---|---|---|
| D (mm) | 25 | 25 |
| d (mm) | 8 | 8 |
| H (mm) | 3 | 1.8 |
| h1 (µm) | 87 | 31 |
| h2 (µm) | 9 | 3.2 |
| R (mm) | 900 | 2500 |

Figure 13B:
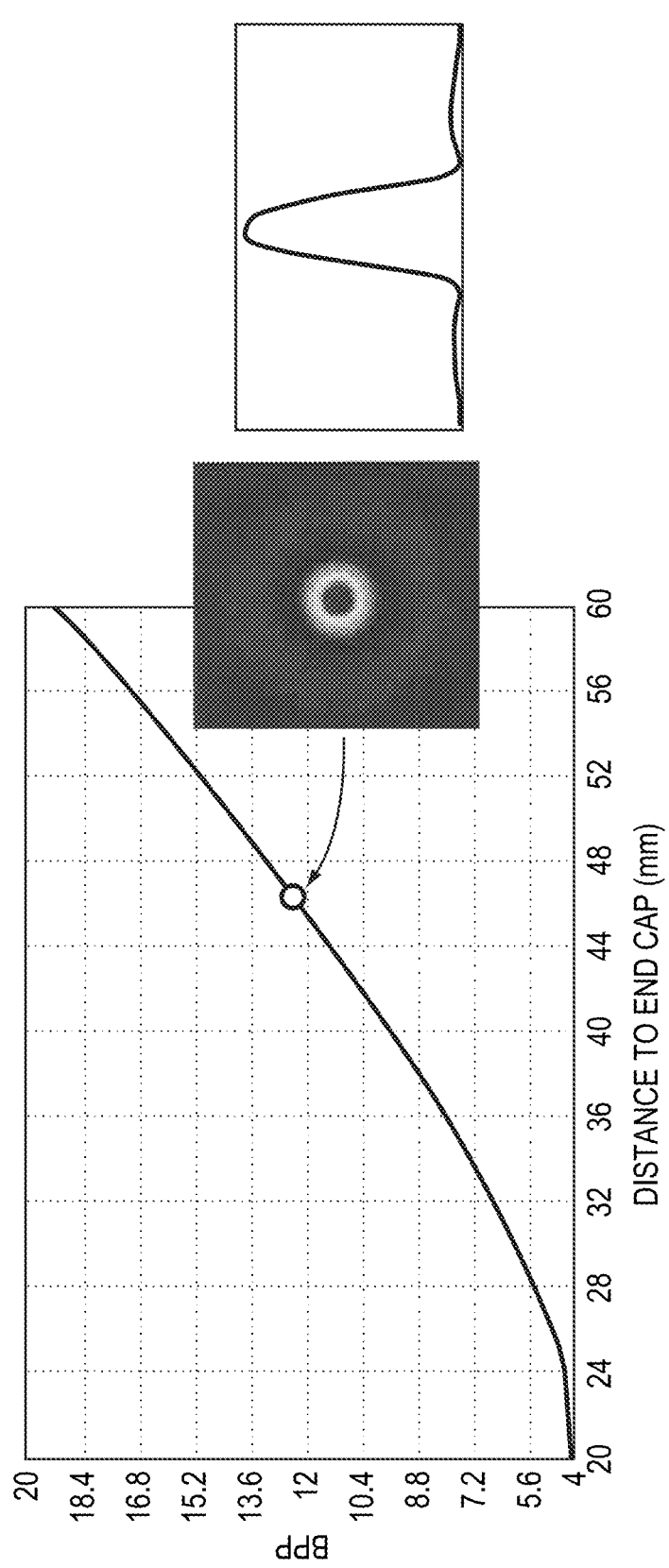
FIG. 13B is a graph of BPP variation as a function of the distance of a fused silica meniscus lens optical element from a beam source in accordance with various embodiments of the invention.

FIG. 13B is a graph of BPP at different distances from the fiber end cap 105 to the exemplary fused silica optical element 1300 having the design parameters provided in Table 4. In the plot, the initial position of the optical element 1300 is assumed to be 25 mm from the end cap 105. As shown, the BPP of the beam may be increased from about 4 to about 12 via displacement of the optical element 1300 by approximately 24 mm. The beam profile at a 46 mm distance of the optical element 1300 to the fiber end cap 105 is also shown in FIG. 13B, as is a graph of the irradiance as a function of position for the 46 mm spacing between optical element 1300 and end cap 105.

Figure 14A:
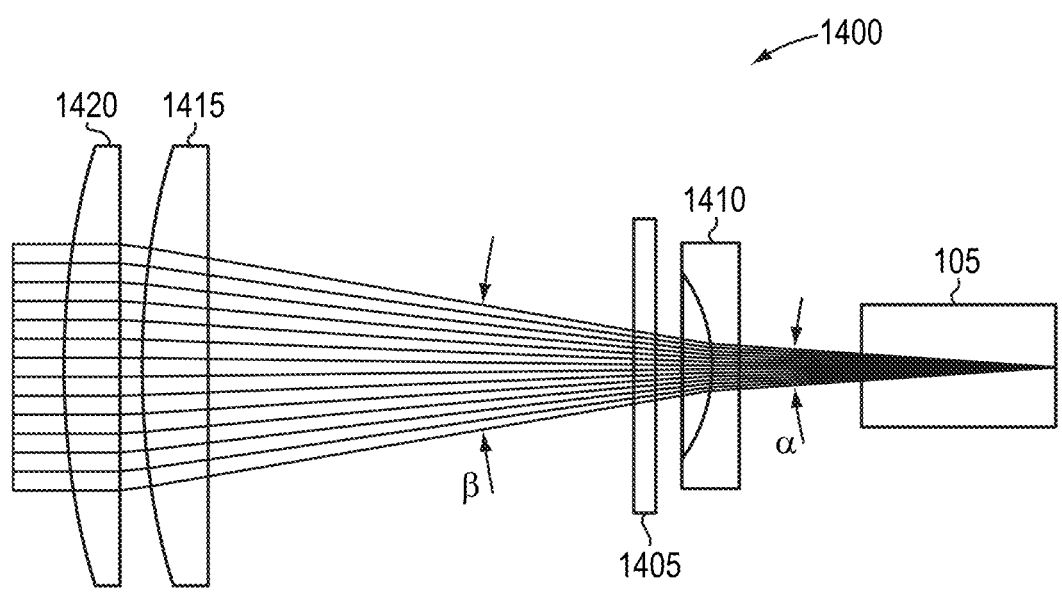
FIG. 14A is a schematic diagram of a partial laser beam delivery system incorporating a triplet collimator for increased beam divergence in accordance with various embodiments of the invention.

Laser beam delivery systems in accordance with embodiments of the present invention may also utilize various lens arrangements to form larger, more diverged input beams for BPP variation as a function of optical element movement. FIG. 14A depicts portions of a laser delivery system 1400 that incorporates a movable optical element 1405 for BPP variation and a triplet collimator for increasing divergence of the laser beam. As shown, the triplet collimator increases the divergence of the beam from an angle α to an angle β. In various embodiments, the ratio of β to α is between approximately 2 and approximately 1.5, e.g., approximately 1.74. As described in more detail below, this increased divergence enables greater control over BPP with less movement of the optical element 1405. In various embodiments, the optical element 1405 includes, consists essentially of, or consists of any one or more of optical element 200, optical element 500, optical element 1300, phase plates 1200/1210, or axicon lenses 800, 810.

Figure 14B:
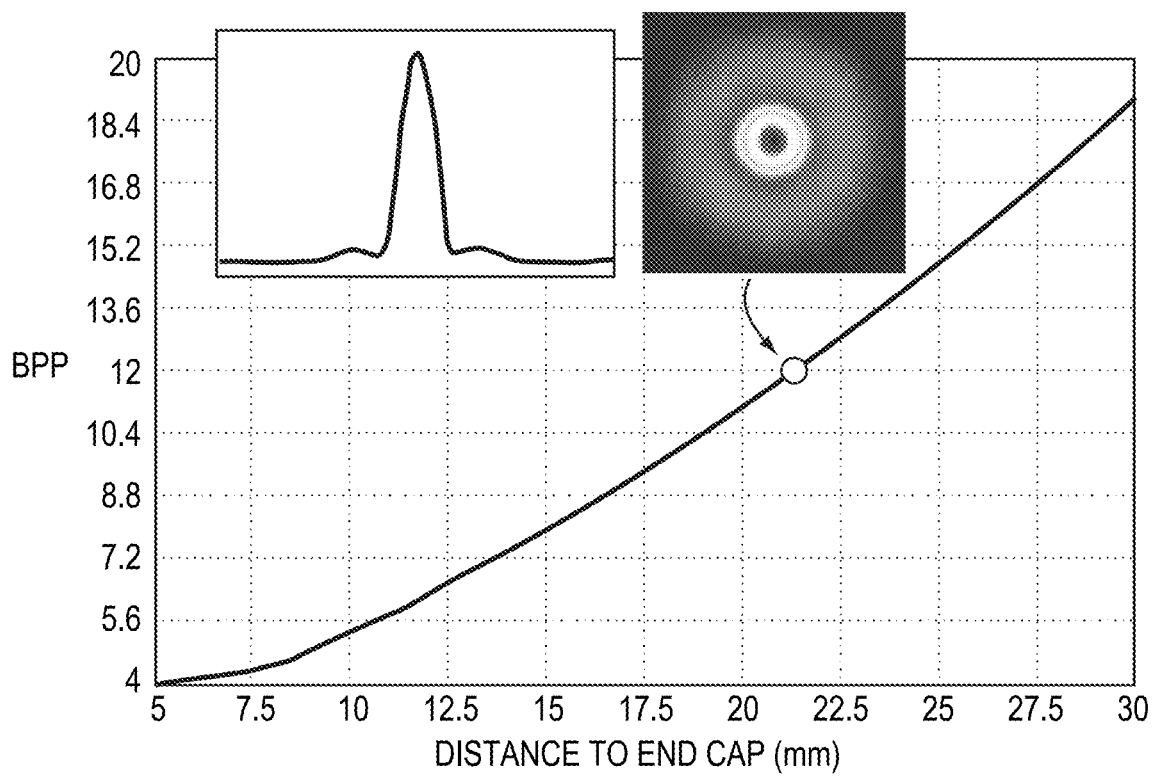
FIG. 14B is a graph of BPP variation as a function of the distance of a flat-top spherical optical element from a beam source in the laser delivery system of FIG. 14A in accordance with various embodiments of the invention.

Triplet collimators for increasing beam divergence in accordance with embodiments of the invention may be composed of various combinations of lenses. FIG. 14A depicts one such embodiment that includes a plano-concave lens 1410, a meniscus lens 1415 (e.g., a positive meniscus lens), and a plano-convex lens 1420. In various embodiments of the invention, the optical element 1405 is disposed in the beam path between plano-concave lens 1410 and meniscus lens 1415. In other embodiments, the optical element 1405 may be disposed in the beam path between meniscus lens 1415 and plano-convex lens 1420 or even optically downstream of plano-convex lens 1420. FIG. 14B is a graph of BPP at different distances from the fiber end cap 105 to the exemplary fused silica optical element 200 having the design parameters provided in Table 1 when utilized in laser beam delivery system 1400 in conjunction with a triplet collimator for increased beam divergence. In the plot, the initial position of the optical element 200 is assumed to be 25 mm from the end cap 105. As shown, the BPP of the beam may be increased from about 4 to about 12 via displacement of the optical element 200 by only approximately 16 mm, or about a factor of 2 less displacement (i.e., greater control) when compared to the beam delivery system lacking the triplet collimator of FIG. 14A (see FIG. 3A). The beam profile at a 21 mm distance of the optical element 200 to the fiber end cap 105 is also shown in FIG. 14B.

Figure 14C:
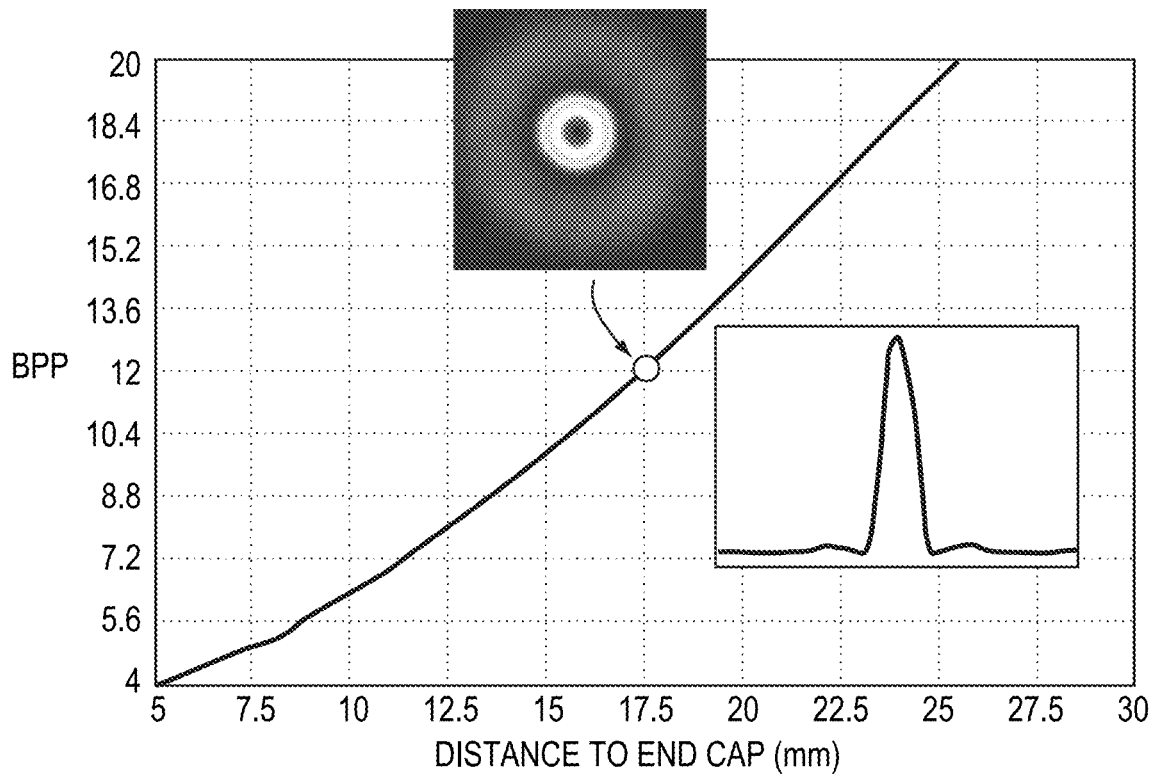
FIG. 14C is a graph of BPP variation as a function of the distance of a meniscus lens optical element from a beam source in the laser delivery system of FIG. 14A in accordance with various embodiments of the invention.

FIG. 14C is a graph of BPP at different distances from the fiber end cap 105 to the exemplary fused silica optical element 1300 having the design parameters provided in Table 4 when utilized in laser beam delivery system 1400 in conjunction with a triplet collimator for increased beam divergence. In the plot, the initial position of the optical element 1300 is assumed to be 25 mm from the end cap 105. As shown, the BPP of the beam may be increased from about 4 to about 12 via displacement of the optical element 200 by only approximately 12 mm, or about a factor of 2 less displacement (i.e., greater control) when compared to the beam delivery system lacking the triplet collimator of FIG. 14A (see FIG. 13B). The beam profile at a 17.5 mm distance of the optical element 1300 to the fiber end cap 105 is also shown in FIG. 14C.

Figure 14D:
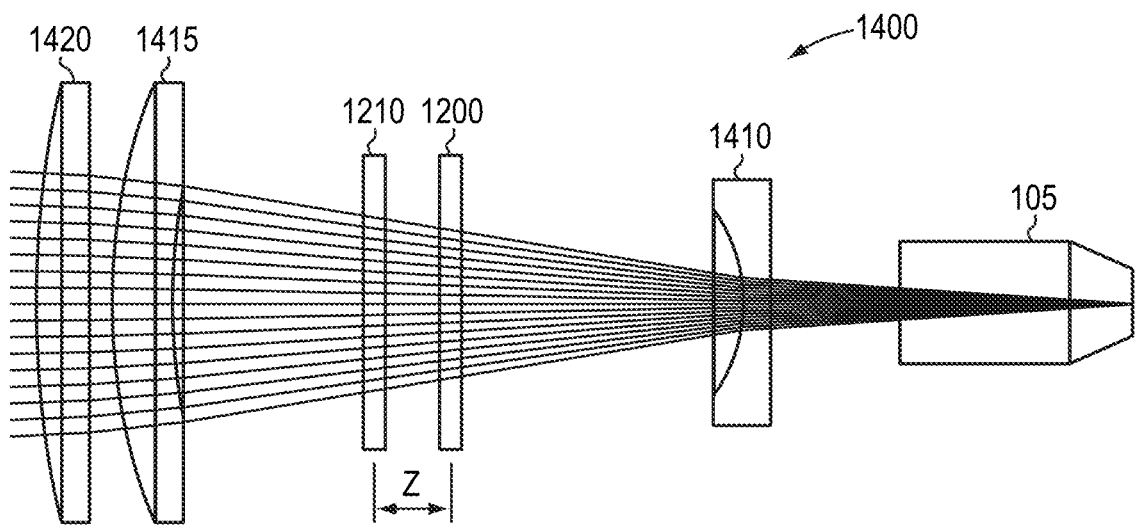
FIG. 14D is a schematic diagram of a partial laser beam delivery system incorporating a triplet collimator for increased beam divergence and twin phase plate optical elements in accordance with various embodiments of the invention.
Figure 14E:
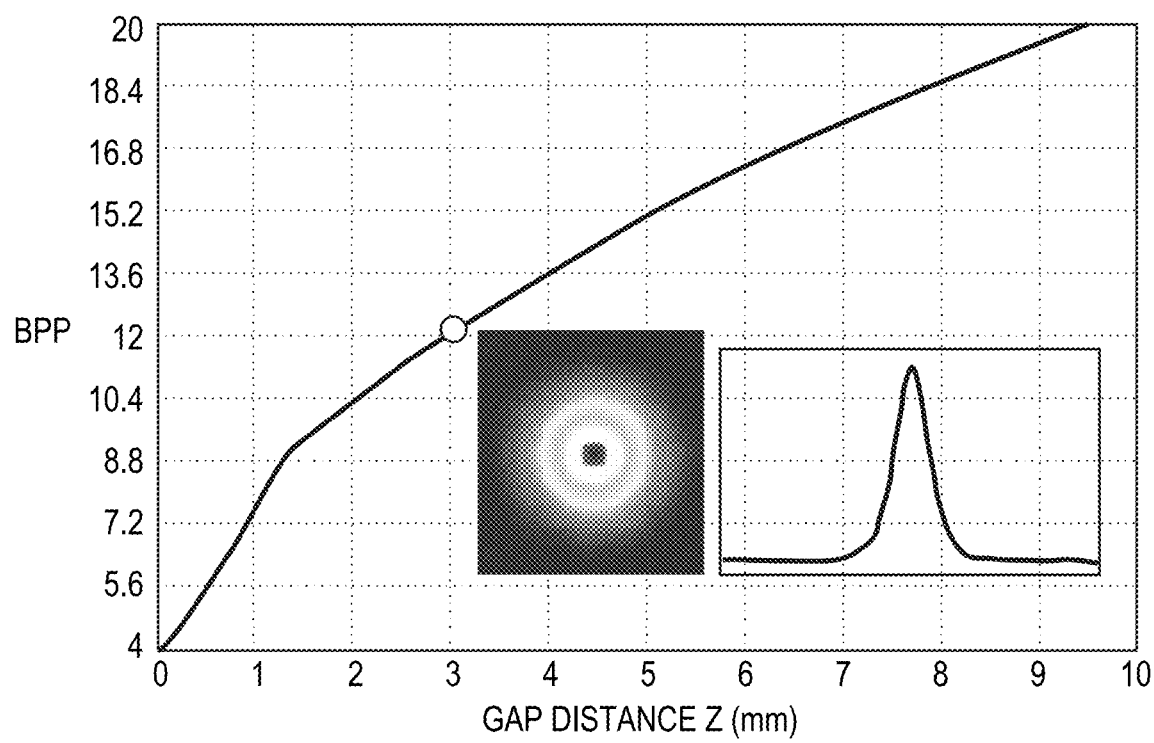
FIG. 14E is a graph of the BPP variation as a function of gap distance between the twin phase plate lenses in the laser beam delivery system of FIG. 14D in accordance with various embodiments of the invention.

FIG. 14D is a schematic of partial laser beam delivery system 1400 incorporating the twin phase plate optical elements 1200, 1210 described above separated within the beam path by a gap distance Z. FIG. 14E is a graph of BPP for different gap spacings Z of the exemplary fused silica optical elements 1200, 1210 having the design parameters provided in Table 3 when utilized in laser beam delivery system 1400 in conjunction with a triplet collimator for increased beam divergence. In the plot, the position of the optical element 1200 is assumed to be 25 mm from the end cap 105. As shown, the BPP of the beam may be increased from about 4 to about 12 via increasing the gap distance Z between the optical elements 1200, 1210 by only approximately 3 mm, or about a factor of 3 less displacement (i.e., greater control) when compared to the beam delivery system lacking the triplet collimator of FIG. 14A (see FIG. 12F). The beam profile at a 3 mm gap distance between optical elements 1200, 1210 is also shown in FIG. 14C.

Figure 15:
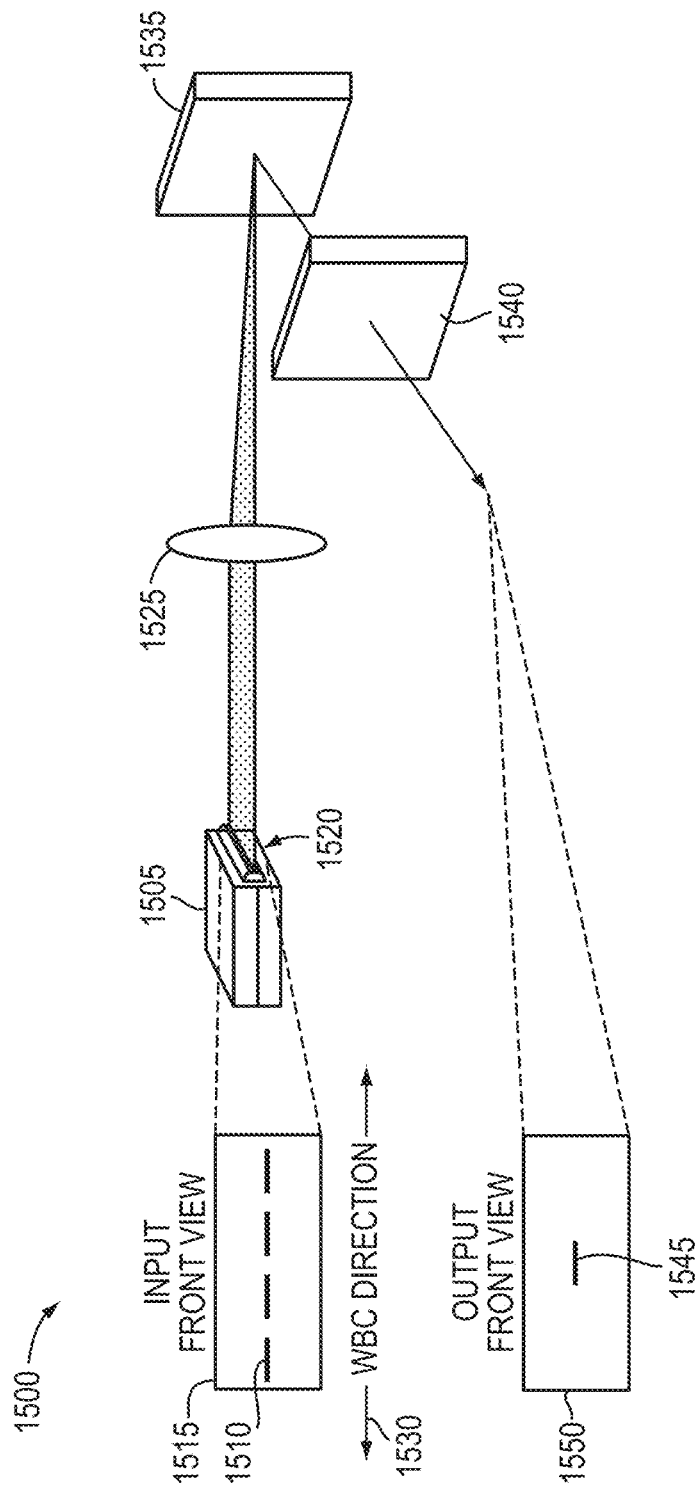
FIG. 15 is a schematic diagram of a wavelength beam combining laser system that may be utilized to supply the input beam for laser beam delivery systems in accordance with various embodiments of the invention.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as the input beams for laser beam delivery systems for variation of BPP as detailed herein. FIG. 15 depicts an exemplary WBC laser system 1500 that utilizes one or more lasers 1505. In the example of FIG. 15, laser 1505 features a diode bar having four beam emitters emitting beams 1510 (see magnified input view 1515), but embodiments of the invention may utilize diode bars emitting any number of individual beams or two-dimensional arrays or stacks of diodes or diode bars. In view 1515, each beam 1510 is indicated by a line, where the length or longer dimension of the line represents the slow diverging dimension of the beam, and the height or shorter dimension represents the fast diverging dimension. A collimation optic 1520 may be used to collimate each beam 1510 along the fast dimension. Transform optic(s) 1525, which may include or consist essentially of one or more cylindrical or spherical lenses and/or mirrors, are used to combine each beam 1510 along a WBC direction 1530. The transform optics 1525 then overlap the combined beam onto a dispersive element 1535 (which may include or consist essentially of, e.g., a reflective or transmissive diffraction grating, a dispersive prism, a grism (prism/grating), a transmission grating, or an Echelle grating), and the combined beam is then transmitted as single output profile onto an output coupler 1540. The output coupler 1540 then transmits the combined beams 1545 as shown on the output front view 1550. The output coupler 1540 is typically partially reflective and acts as a common front facet for all the laser elements in this external cavity system 1500. An external cavity is a lasing system where the secondary mirror is displaced at a distance away from the emission aperture or facet of each laser emitter. In some embodiments, additional optics are placed between the emission aperture or facet and the output coupler or partially reflective surface. The output beam 1545 is a thus a multiple-wavelength beam (combining the wavelengths of the individual beams 1510), and may be utilized as the input beam in laser beam delivery systems detailed herein and/or may be coupled into an optical fiber.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A laser delivery system for receiving and altering a spatial power distribution of a radiation beam from a beam source and focusing the radiation with the altered spatial power distribution onto a workpiece, the system comprising:
    a collimating lens for collimating the radiation beam;
    a focusing lens for receiving the collimated beam and focusing the beam toward the workpiece;
    disposed between the beam source and the collimating lens, first and second optical elements for receiving the radiation beam and altering the spatial power distribution thereof;
    a lens manipulation system for changing at least one of (i) a position of the first optical element within a path of the radiation beam, (ii) a position of the second optical element within the path of the radiation beam, or (iii) a distance between the first and second optical elements; and
    a controller for controlling the lens manipulation system to achieve a target altered spatial power distribution on the workpiece,
    wherein the lens manipulation system is configured to fixedly position at least one of the first optical element or the second optical element transversely off-center within the path of the radiation beam.

2. The system of claim 1, wherein at least one of the first optical element or the second optical element is positioned transversely off-center within the path of the radiation beam.

3. The system of claim 1, wherein the first optical element and the second optical element are both positioned transversely off-center within the path of the radiation beam.

4. The system of claim 1, wherein (i) the first optical element comprises a double-concave axicon lens and (ii) the second optical element comprises a double-convex axicon lens.

5. The system of claim 1, wherein the lens manipulation system is configured to change the distance between the first and second optical elements within the range of approximately 0 mm to approximately 20 mm.

6. The system of claim 1, wherein the beam source comprises:
    a beam emitter emitting a plurality of discrete beams;
    focusing optics for focusing the plurality of beams onto a dispersive element;
    a dispersive element for receiving and dispersing the received focused beams; and
    a partially reflective output coupler positioned to receive the dispersed beams, transmit a portion of the dispersed beams therethrough as the radiation beam, and reflect a second portion of the dispersed beams back toward the dispersive element,
    wherein the radiation beam is composed of multiple wavelengths.

7. The system of claim 6, wherein the dispersive element comprises a diffraction grating.

8. The system of claim 1, wherein the controller is configured to operate the beam source to emit the radiation beam to the workpiece when the at least one of the first optical element or the second optical element is fixedly positioned transversely off-center within the path of the radiation beam.

9. The system of claim 1, wherein at least a portion of a surface of the first optical element is convexly curved.

10. The system of claim 9, wherein at least a portion of a surface of the second optical element is concavely curved.

11. The system of claim 1, wherein at least a portion of a surface of the second optical element is concavely curved.

12. The system of claim 1, wherein the lens manipulation system is configured to change the distance between the first and second optical elements within the range of approximately 2 mm to approximately 50 mm.

13. The system of claim 1, wherein the controller is configured to control the lens manipulation system based on one or properties of the workpiece.

14. The system of claim 13, wherein the one or more properties of the workpiece comprise at least one of a distance to the workpiece, a composition of the workpiece, or a topography of the workpiece.

15. The system of claim 1, wherein at least one of the first optical element or the second optical element comprises at least one of fused silica or zinc sulfide.

16. The system of claim 1, wherein the controller is configured to, with the radiation beam, at least one of weld the workpiece, cut the workpiece, or drill the workpiece when the at least one of the first optical element or the second optical element is fixedly positioned transversely off-center within the path of the radiation beam.

17. The system of claim 1, wherein at least one of the first optical element or the second optical element comprises a lens having a first surface having the shape of a truncated cone.

18. The system of claim 17, wherein the lens has a second surface, opposite the first surface, that is substantially planar.

19. The system of claim 18, wherein the first surface is optically upstream of the second surface.

20. The system of claim 1, wherein at least one of the first optical element or the second optical element comprises a lens having a first surface having the shape of a truncated sphere.

21. The system of claim 20, wherein the lens has a second surface, opposite the first surface, that is substantially planar.

22. The system of claim 21, wherein the first surface is optically upstream of the second surface.

23. The system of claim 1, wherein at least one of the first optical element or the second optical element comprises a meniscus lens.

24. The system of claim 1, wherein at least a portion of at least one surface of at least one of the first optical element or the second optical element is substantially planar.

25. The system of claim 1, wherein the first optical element and the second optical element are disposed within a processing head.

26. The system of claim 25, further comprising an optical fiber disposed between the beam source and the processing head.

* * * * *